(12) United States Patent
Yun et al.

(10) Patent No.: US 12,550,253 B2
(45) Date of Patent: Feb. 10, 2026

(54) STORAGE DEVICE INCLUDING CONFIGURABLE PRINTED CIRCUIT BOARD

(71) Applicant: SAMSUNG ELECTRONICS CO., LTD., Suwon-si (KR)

(72) Inventors: Sun-Ki Yun, Suwon-si (KR); Hwi-Jong Yoo, Suwon-si (KR); Jeonggi Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/103,175

(22) Filed: Jan. 30, 2023

(65) Prior Publication Data

US 2023/0284378 A1  Sep. 7, 2023

(30) Foreign Application Priority Data

Mar. 4, 2022 (KR) .................. 10-2022-0028382
May 26, 2022 (KR) .................. 10-2022-0064728

(51) Int. Cl.
  *H05K 1/02* (2006.01)
  *G06F 3/06* (2006.01)
  *G06F 13/10* (2006.01)
  *H05K 1/16* (2006.01)

(52) U.S. Cl.
  CPC ......... *H05K 1/0286* (2013.01); *G06F 3/0679* (2013.01); *G06F 13/10* (2013.01); *H05K 1/0296* (2013.01); *H05K 1/167* (2013.01); *G06F 2213/0026* (2013.01); *H05K 2201/10159* (2013.01); *H05K 2201/10659* (2013.01)

(58) Field of Classification Search
  None
  See application file for complete search history.

(56) References Cited

U.S. PATENT DOCUMENTS

| 6,871,253 | B2 | 3/2005 | Greeff et al. |
| 6,930,904 | B2* | 8/2005 | Wu ..................... G06F 13/4243 365/72 |
| 7,099,966 | B2 | 8/2006 | Chan et al. |
| 7,245,145 | B2* | 7/2007 | Pax .......................... G11C 5/04 365/194 |
| 7,646,212 | B2* | 1/2010 | Sung ..................... G11C 5/063 326/31 |
| 8,036,011 | B2 | 10/2011 | Kim et al. |

(Continued)

FOREIGN PATENT DOCUMENTS

| JP | 2020123774 A | 8/2020 |
| KR | 100943861 B1 | 2/2010 |
| KR | 10-2021-0157749 A | 12/2021 |

*Primary Examiner* — Long Pham
(74) *Attorney, Agent, or Firm* — Sughrue Mion, PLLC

(57) ABSTRACT

A storage device includes a printed circuit board including a controller site, a first memory site, a second memory site, first conductive lines connected with the controller site, second conductive lines connected with the first memory site, and third conductive lines connected with the second memory site, a controller package provided on the controller site, a first nonvolatile memory package provided on the first memory site, a second nonvolatile memory package provided on the second memory site, and at least one resistor connecting at least one conductive line of the first conductive lines with at least one conductive line of the second conductive lines.

20 Claims, 14 Drawing Sheets

(56) References Cited

U.S. PATENT DOCUMENTS

| | | |
|---|---|---|
| 8,195,855 B2 | 6/2012 | Jeong et al. |
| 10,750,610 B2* | 8/2020 | Paek ..................... H05K 1/025 |
| 10,820,419 B2 | 10/2020 | Seo et al. |
| 11,200,190 B2 | 12/2021 | Zhao et al. |
| 2011/0176345 A1* | 7/2011 | Chen ..................... H05K 1/025 |
| | | 365/51 |

* cited by examiner

STORAGE DEVICE INCLUDING CONFIGURABLE PRINTED CIRCUIT BOARD

CROSS-REFERENCE TO RELATED APPLICATIONS

This application is based on and claims priority to Korean Patent Application No. 10-2022-0028382 filed on Mar. 4, 2022, and Korean Patent Application No. 10-2022-0064728 filed on May 26, 2022, in the Korean Intellectual Property Office, the disclosures of which are incorporated by reference herein in their entireties.

BACKGROUND

1. Field

Example embodiments of the present disclosure relate to an electronic device, and more particularly, to a storage device including a printed circuit board that is configurable depending on kinds of memory packages mounted thereon.

2. Description of Related Art

A storage device may include a nonvolatile memory device and may support a function of storing data in and reading data from the nonvolatile memory device. The storage device may be used in various applications. Capacities of storage devices that are necessary in various applications may diversify. The demand on the topology of components in a storage device, that is, the topology of conductive lines of a printed circuit board may change depending on a capacity of the storage device.

To reduce costs for manufacturing the storage device, storage devices of various capacities may be manufactured based on the same printed circuit board. To support storage devices of various capacities, conductive lines of a printed circuit board may be manufactured based on the topology requiring the greatest number of conductive lines. In this case, some of the conductive lines thus manufactured may not be used and left alone in a storage device whose capacity is implemented by using conductive lines of a relatively simple topology. The left-alone conductive lines may hinder the signal integrity (SI).

SUMMARY

One or more example embodiments provide a storage device preventing unused conductive lines of a printed circuit board from hindering the signal integrity (SI).

Additional aspects will be set forth in part in the description which follows and, in part, will be apparent from the description, or may be learned by practice of the presented embodiments.

According to an aspect of an example embodiment, a storage device may include a printed circuit board including a controller site, a first memory site, a second memory site, first conductive lines connected with the controller site, second conductive lines connected with the first memory site, and third conductive lines connected with the second memory site, a controller package provided on the controller site, a first nonvolatile memory package provided on the first memory site, a second nonvolatile memory package provided on the second memory site, and at least one resistor connecting at least one conductive line of the first conductive lines with at least one conductive line of the second conductive lines.

According to an aspect of an example embodiment, a storage device may include a printed circuit board including a controller site, a first memory site, a second memory site, first conductive lines connected with the controller site, second conductive lines connected with the first memory site, and third conductive lines connected with the second memory site, a controller package provided on the controller site, a first nonvolatile memory package provided on the first memory site, a second nonvolatile memory package provided on the second memory site, and resistors connected with at least two of the third conductive lines and at least two of the first conductive lines, where the first conductive lines are connected with the second conductive lines, and conductive lines of the third conductive lines other than the at least two the third conductive lines are separated from the first conductive lines and the second conductive lines.

According to an aspect of an example embodiment, a storage device may include a printed circuit board including a controller site, a first memory site, a second memory site, first conductive lines connected with the controller site, second conductive lines connected with the first memory site, and third conductive lines connected with the second memory site, a controller package provided on the controller site, a first nonvolatile memory provided mounted on the first memory site, a second nonvolatile memory package provided on the second memory site, first resistors connected with at least two of the first conductive lines and at least two of the second conductive lines, and second resistors connected with conductive lines other than the at least two of the first conductive lines and at least two of the third conductive lines.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Below, example embodiments of the present disclosure will be described in detail and clearly to such an extent that an ordinary one in the art easily implements the present disclosure. Below, the term "and/or" is interpreted as including any one of items listed with regard to the term, or a combination of some of the listed items.

Figure 1:
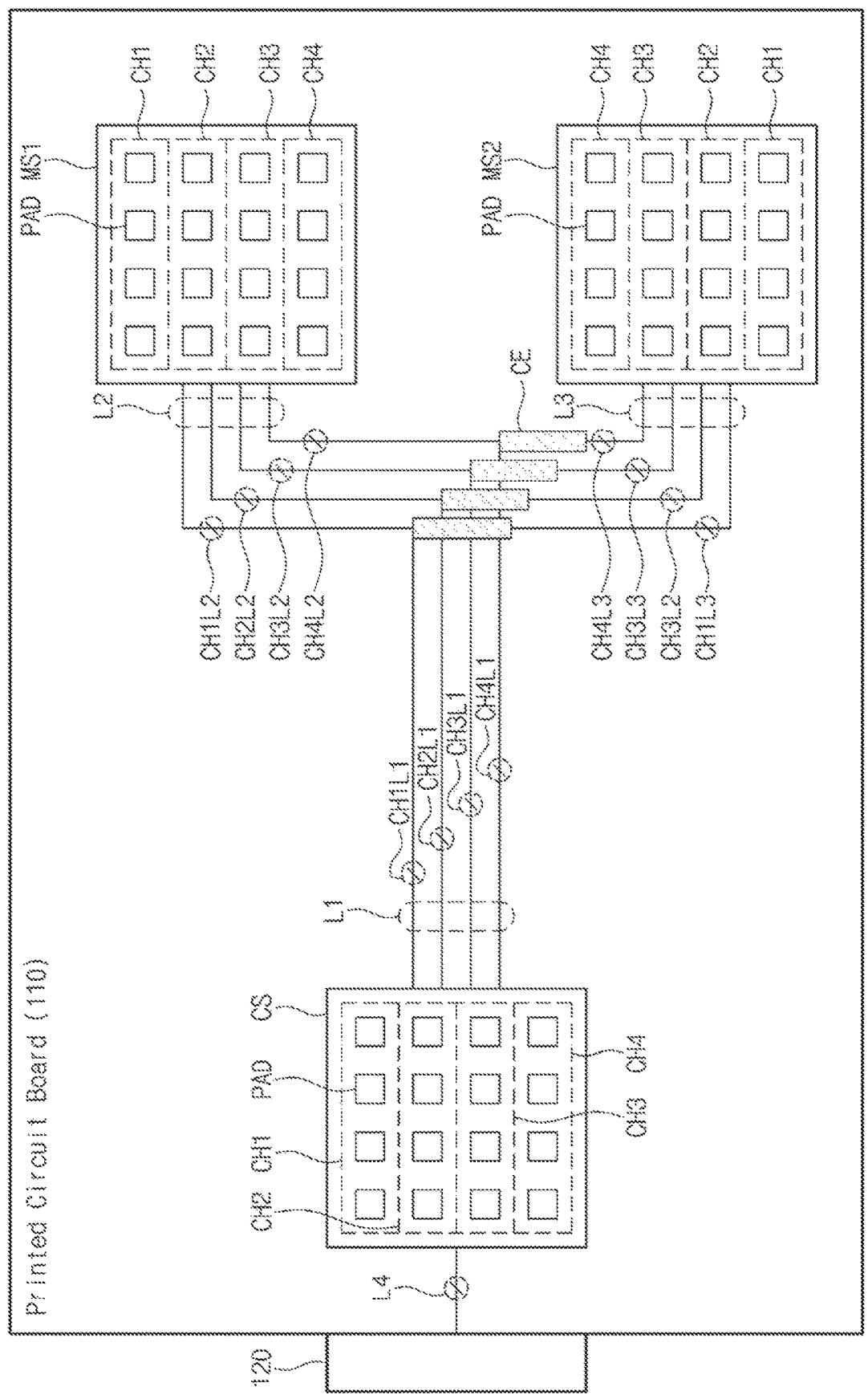
FIG. 1 is a diagram illustrating a printed circuit board of a storage device according to an example embodiment of the present disclosure.

FIG. 1 is a diagram illustrating a printed circuit board 110 of a storage device according to an example embodiment of the present disclosure. Referring to FIG. 1, the printed circuit board 110 may include a controller site CS, a first memory site MS1, a second memory site MS2, first conductive lines L1, second conductive lines L2, third conductive lines L3, and fourth conductive lines L4. The printed circuit board 110 may be connected with a connector 120.

The controller site CS may be configured such that a controller package configured to control memories, for example, nonvolatile memories, is mounted therein. The controller site CS may include pads PAD configured to be coupled to solder balls of the controller package.

The controller package mounted in the controller site CS may be configured to control the nonvolatile memories through a plurality of channels. In an example embodiment, the controller package may control the nonvolatile memories through first to fourth channels CH1 to CH4, but the number of channels is not limited thereto.

Groups of the pads PAD of the controller site CS may be respectively allocated to channels. In an example embodiment, the groups of the pads PAD of the controller site CS may be respectively allocated to the first to fourth channels CH1 to CH4.

The first memory site MS1 may be configured such that a nonvolatile memory package including memories, for example, nonvolatile memories (e.g., memory chips), is mounted therein. The first memory site MS1 may include pads PAD configured to be coupled to solder balls of the nonvolatile memory package.

The nonvolatile memory package mounted in the first memory site MS1 may be configured to be controlled by the controller package mounted in the controller site CS through a plurality of channels. In an example embodiment, the nonvolatile memory package may be controlled by the controller package through the first to fourth channels CH1 to CH4, but the number of channels is not limited thereto.

Groups of the pads PAD of the first memory site MS1 may be respectively allocated to channels. In an example embodiment, the groups of the pads PAD of the first memory site MS1 may be respectively allocated to the first to fourth channels CH1 to CH4.

The second memory site MS2 may be configured such that a nonvolatile memory package including memories, for example, nonvolatile memories (e.g., memory chips), is mounted therein. The second memory site MS2 may include pads PAD configured to be coupled to solder balls of the nonvolatile memory package.

The nonvolatile memory package mounted in the second memory site MS2 may be configured to be controlled by the controller package mounted in the controller site CS through a plurality of channels. In an example embodiment, it the nonvolatile memory package may be controlled by the controller package through the first to fourth channels CH1 to CH4, but the number of channels is not limited thereto.

Groups of the pads PAD of the second memory site MS2 may be respectively allocated to channels. In an example embodiment, the groups of the pads PAD of the second memory site MS2 may be respectively allocated to the first to fourth channels CH1 to CH4.

The first conductive lines L1 may be electrically connected with the controller site CS (e.g., connected to the pads PAD of the controller site CS). The first conductive lines L1 may include first channel conductive lines CH1L1, second channel conductive lines CH2L1, third channel conductive lines CH3L1, and fourth channel conductive lines CH4L1.

The first channel conductive lines CH1L1 of the first conductive lines L1 may be electrically connected with pads allocated to the first channel CH1 from among the pads PAD of the controller site CS. The second channel conductive lines CH2L1 of the first conductive lines L1 may be electrically connected with pads allocated to the second channel CH2 from among the pads PAD of the controller site CS. The third channel conductive lines CH3L1 of the first conductive lines L1 may be electrically connected with pads allocated to the third channel CH3 from among the pads PAD of the controller site CS. The fourth channel conductive lines CH4L1 of the first conductive lines L1 may be electrically connected with pads allocated to the fourth channel CH4 from among the pads PAD of the controller site CS.

The second conductive lines L2 may be electrically connected with the first memory site MS1 (e.g., connected to the pads PAD of the first memory site MS1). The second conductive lines L2 may include first channel conductive lines CH1L2, second channel conductive lines CH2L2, third channel conductive lines CH3L2, and fourth channel conductive lines CH4L2.

The first channel conductive lines CH1L2 of the second conductive lines L2 may be electrically connected with pads allocated to the first channel CH1 from among the pads PAD of the first memory site MS1. The second channel conductive lines CH2L2 of the second conductive lines L2 may be electrically connected with pads allocated to the second channel CH2 from among the pads PAD of the first memory site MS1. The third channel conductive lines CH3L2 of the second conductive lines L2 may be electrically connected with pads allocated to the third channel CH3 from among the pads PAD of the first memory site MS1. The fourth channel conductive lines CH4L2 of the second conductive lines L2 may be electrically connected with pads allocated to the fourth channel CH4 from among the pads PAD of the first memory site MS1.

The third conductive lines L3 may be electrically connected with the second memory site MS2 (e.g., connected to, the pads PAD of the second memory site MS2). The third conductive lines L3 may include first channel conductive lines CH1L3, second channel conductive lines CH2L3, third channel conductive lines CH3L3, and fourth channel conductive lines CH4L3.

The first channel conductive lines CH1L3 of the third conductive lines L3 may be electrically connected with pads allocated to the first channel CH1 from among the pads PAD of the second memory site MS2. The second channel conductive lines CH2L3 of the third conductive lines L3 may be electrically connected with pads allocated to the second channel CH2 from among the pads PAD of the second memory site MS2. The third channel conductive lines CH3L3 of the third conductive lines L3 may be electrically connected with pads allocated to the third channel CH3 from among the pads PAD of the second memory site MS2. The fourth channel conductive lines CH4L3 of the third conductive lines L3 may be electrically connected with pads allocated to the fourth channel CH4 from among the pads PAD of the second memory site MS2.

The first conductive lines L1 may be respectively (e.g., physically and electrically) connected with the second conductive lines L2. The first channel conductive lines CH1L1 of the first conductive lines L1 may be respectively connected with the first channel conductive lines CH1L2 of the second conductive lines L2. The second channel conductive lines CH2L1 of the first conductive lines L1 may be respectively connected with the second channel conductive lines CH2L2 of the second conductive lines L2. The third channel conductive lines CH3L1 of the first conductive lines L1 may be respectively connected with the third channel conductive lines CH3L2 of the second conductive lines L2. The fourth channel conductive lines CH4L1 of the first conductive lines L1 may be respectively connected with the fourth channel conductive lines CH4L2 of the second conductive lines L2.

Conductive elements CE may be attached on the printed circuit board 110. The conductive elements CE may electrically connect third conductive lines L3 with the first conductive lines L1 and the second conductive lines L2, respectively.

For example, some of the conductive elements CE may connect the first channel conductive lines CH1L3 of the third conductive lines L3 with points where the first channel conductive lines CH1L1 of the first conductive lines L1 and the first channel conductive lines CH1L2 of the second conductive lines L2 are connected with each other. First pads (i.e., that would be covered by the conductive element CE shown in FIG. 1) that are conductive may be connected with the ends of the first channel conductive lines CH1L3 of the third conductive lines L3. Second pads that are conductive may be connected at points where the first channel conductive lines CH1L1 of the first conductive lines L1 and the first channel conductive lines CH1L2 of the second conductive lines L2 are connected with each other. Some of the conductive elements CE may be electrically connected with the first channel conductive lines CH1L3 of the third conductive lines L3 through the first pads being conductive, and may be electrically connected at points at which the first channel conductive lines CH1L1 of the first conductive lines L1 and the first channel conductive lines CH1L2 of the second conductive lines L2 are electrically connected, by way of the second pads being conductive.

Some of the conductive elements CE may connect the second channel conductive lines CH2L3 of the third conductive lines L3 with points where the second channel conductive lines CH2L1 of the first conductive lines L1 and the second channel conductive lines CH2L2 of the second conductive lines L2 are connected with each other. First pads (i.e., that could be covered by the conductive element CE of FIG. 1) that are conductive may be connected with the ends of the second channel conductive lines CH2L3 of the third conductive lines L3. Second pads that are conductive may be connected at points where the second channel conductive lines CH2L1 of the first conductive lines L1 and the second channel conductive lines CH2L2 of the second conductive lines L2 are connected with each other. Some of the conductive elements CE may be electrically connected with the second channel conductive lines CH2L3 of the third conductive lines L3 through the first pads being conductive, and may be electrically connected at points, at which the second channel conductive lines CH2L1 of the first conductive lines L1 and the second channel conductive lines CH2L2 of the second conductive lines L2 are electrically connected, by way of the second pads being conductive.

Some of the conductive elements CE may connect the third channel conductive lines CH3L3 of the third conductive lines L3 with points where the third channel conductive lines CH3L1 of the first conductive lines L1 and the third channel conductive lines CH3L2 of the second conductive lines L2 are connected with each other. First pads (i.e., that could be covered by the conductive element CE in FIG. 1) that are conductive may be connected with the ends of the third channel conductive lines CH3L3 of the third conductive lines L3. Second pads that are conductive may be connected at points where the third channel conductive lines CH3L1 of the first conductive lines L1 and the third channel conductive lines CH3L2 of the second conductive lines L2 are connected with each other. Some of the conductive elements CE may be electrically connected with the third channel conductive lines CH3L3 of the third conductive lines L3 through the first pads being conductive, and may be electrically connected at points at which the third channel conductive lines CH3L1 of the first conductive lines L1 and the third channel conductive lines CH3L2 of the second conductive lines L2 are electrically connected, by way of the second pads being conductive.

Some of the conductive elements CE may connect the fourth channel conductive lines CH4L3 of the third conductive lines L3 with points where the fourth channel conductive lines CH4L1 of the first conductive lines L1 and the fourth channel conductive lines CH4L2 of the second conductive lines L2 are connected with each other. First pads (i.e., that would be covered by the conductive element CE in FIG. 1) that are conductive may be connected with the ends of the fourth channel conductive lines CH4L3 of the third conductive lines L3. Second pads that are conductive may be connected at points where the fourth channel conductive lines CH4L1 of the first conductive lines L1 and the fourth channel conductive lines CH4L2 of the second conductive lines L2 are connected with each other. Some of the conductive elements CE may be electrically connected with the fourth channel conductive lines CH4L3 of the third conductive lines L3 through the first pads being conductive, and may be electrically connected at points at which the fourth channel conductive lines CH4L1 of the first conductive lines L1 and the fourth channel conductive lines CH4L2 of the second conductive lines L2 are electrically connected, by way of the second pads being conductive.

The conductive elements CE may be attached on the printed circuit board 110 after conductive pads (e.g., the first and second pads being conductive, which are described above) are manufactured.

Conductive elements of the conductive elements CE which are electrically connected with the first channel conductive lines CH1L1 of the first conductive lines L1 may not be connected with the second channel conductive lines CH2L1, the third channel conductive lines CH3L1, and the fourth channel conductive lines CH4L1 of the first conductive lines L1.

Conductive elements of the conductive elements CE electrically connected with the second channel conductive lines CH2L1 of the first conductive lines L1 may not be electrically connected with the third channel conductive lines CH3L1 and the fourth channel conductive lines CH4L1 of the first conductive lines L1. Conductive elements of the conductive elements CE electrically connected with the third channel conductive lines CH3L1 of the first conductive lines L1 may not be electrically connected with the fourth channel conductive lines CH4L1 of the first conductive lines L1.

The conductive elements CE may be exposed on the printed circuit board 110. A height of upper surfaces of the conductive elements CE (e.g., measured from a surface of the printed circuit board 110) may be higher than a height of upper surfaces of the first conductive lines L1, the second conductive lines L2, and the third conductive lines L3 (e.g., measured from a surface of the printed circuit board 110. That is, the conductive elements CE may protrude from the printed circuit board 110.

In an example embodiment, the conductive elements CE may be resistive elements. The conductive elements CE may be resistive elements where the insulation coating is provided at the portions other than terminals electrically connecting the third conductive lines L3 with the first conductive lines L1 and the second conductive lines L2. Resistance values of the conductive elements CE may be determined by the impedance matching of the first conductive lines L1, the second conductive lines L2, and the third conductive lines L3. For example, the resistance values of the conductive elements CE may be determined such that the signal reflection and attenuation are reduced at the first conductive lines L1, the second conductive lines L2, and the third conductive lines L3.

In an example embodiment, the conductive elements CE may be any other elements with the conductivity. For example, the conductive elements CE may be any other elements where the insulation coating is provided at the portions other than terminals electrically connecting the third conductive lines L3 with the first conductive lines L1 and the second conductive lines L2. For example, the conductive elements CE may be implemented with the same material as the first conductive lines L1, the second conductive lines L2, or the third conductive lines L3.

In an example embodiment, separate conductive lines that extend from the controller site CS and are directly connected with the first memory site MS1 and/or the second memory site MS2 may be provided on or in the printed circuit board 110.

Figure 2:
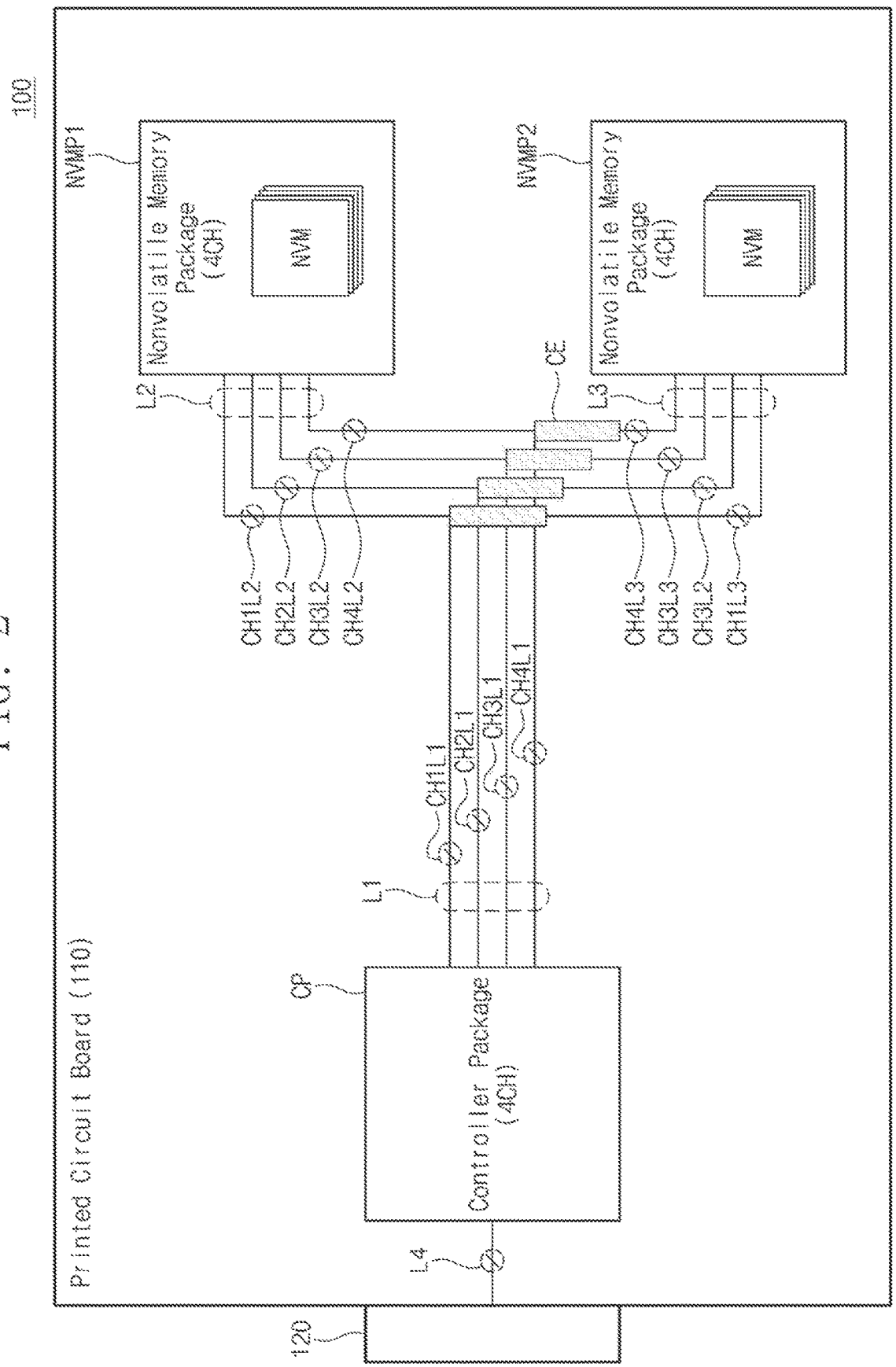
FIG. 2 is a diagram illustrating a storage device according to an example embodiment of the present disclosure.

FIG. 2 is a diagram illustrating a storage device 100 according to an example embodiment of the present disclosure. Referring to FIGS. 1 and 2, a controller package CP may be mounted on the controller site CS of the printed circuit board 110. A first nonvolatile memory package NVMP1 may be mounted on the first memory site MS1 of the printed circuit board 110. A second nonvolatile memory package NVMP2 may be mounted on the second memory site MS2 of the printed circuit board 110.

The first conductive lines L1 may be exposed to the outside on the printed circuit board 110. The second conductive lines L2 may be exposed to the outside on the printed circuit board 110. The third conductive lines L3 may be exposed to the outside on the printed circuit board 110. The conductive elements CE may be exposed to the outside on the printed circuit board 110.

The storage device 100 may be implemented to include the controller package CP mounted in the controller site CS and the first and second nonvolatile memory packages NVMP1 and NVMP2 respectively mounted in the two memory sites MS1 and MS2. However example embodiments of the present disclosure are not limited to FIG. 2. The storage device 100 may be implemented to include a controller package mounted in one controller site and memory packages mounted in at least some of a plurality of memory sites, and conductive lines of memory sites where memory packages are not used may be implemented to be (physically and electrically) separated from conductive lines connected with the controller package.

The controller package CP may access the first and second nonvolatile memory packages NVMP1 and NVMP2 through a plurality of channels (e.g., the first to fourth channels CH1 to CH4). The first and second nonvolatile memory packages NVMP1 and NVMP2 may include a plurality of nonvolatile memory chips NVM corresponding to the first to fourth channels CH1 to CH4. In each of the first and second nonvolatile memory packages NVMP1 and NVMP2, one channel may correspond to one or more nonvolatile memory chips NVM.

The controller package CP may access the nonvolatile memory chips NVM of the first to fourth channels CH1 to CH4 independently of each other (or in parallel). For example, the controller package CP may access the nonvolatile memory chips NVM of the first and second nonvolatile memory packages NVMP1 and NVMP2, which belong to the first channel CH1, through the pads PAD of the controller site CS belonging to the first channel CH1, the first channel conductive lines CH1L1 of the first conductive lines L1, the first channel conductive lines CH1L2 of the second conductive lines L2, and the pads PAD of the first memory site MS1 belonging to the first channel CH1.

Likewise, the controller package CP may access the nonvolatile memory chips NVM of the first and second nonvolatile memory packages NVMP1 and NVMP2, which belong to a k-th channel (k being a positive integer), through the pads PAD of the controller site CS belonging to a k-th channel, k-th channel conductive lines of the first conductive lines L1, k-th channel conductive lines of the second conductive lines L2, and the pads PAD of the first memory site MS1 belonging to the k-th channel.

The nonvolatile memory chips NVM may include NAND flash memories. The pads and conductive lines of each of the first to fourth channels CH1 to CH4 may be configured to transfer data signals, a data strobe signal that provides the timing to latch the data signals transferring data, an address, or a command, a read enable signal that allows the NAND flash memory to generate the data strobe signal, a write enable signal that provides the timing to latch an address or a command, a command latch enable signal indicating that the data signals are commands, an address latch enable signal indicating that the data signals are an address, a chip enable signal indicating a target to be accessed from among the nonvolatile memory chips, a data bus inversion signal indicating whether data are in an inverted state, a reset signal, an on-die termination signal, and a ready/busy signal.

In an example embodiment, the data signals, the data strobe signal, the read enable signal, and the data bus inversion signal may be high-speed signals that toggle at high speed. The address latch enable signal, the command latch enable signal, the write enable signal, the reset signal, the on-die termination signal, the ready/busy signal, and the chip enable signal may be low-speed signals that toggle at low speed.

The high-speed signals may be transferred to the first nonvolatile memory package NVMP1 and the second nonvolatile memory package NVMP2 through the first conductive lines L1, the second conductive lines L2, the third conductive lines L3, and the conductive elements CE as illustrated in FIG. 2. The low-speed signals may be transferred through separate conductive lines of the printed circuit board 110, which are directly connected between the controller package CP and the first nonvolatile memory package NVMP1 and/or the second nonvolatile memory package NVMP2.

The controller package CP may be connected with an external host device through the fourth conductive lines L4 and the connector 120. Signals that are transferred through the fourth conductive lines L4 may be different from signals that are transferred through the first conductive lines L1. For example, unlike the above signals, the controller package CP may exchange signals with the external host device through the fourth conductive lines L4 and the connector 120 based on peripheral component interconnect express (PCIe) or nonvolatile memory express (NVMe).

In an embodiment, the storage device 100 may be implemented with a solid state drive (SSD), a storage class memory (SCM), a removable memory, a memory expander, etc.

Figure 3:
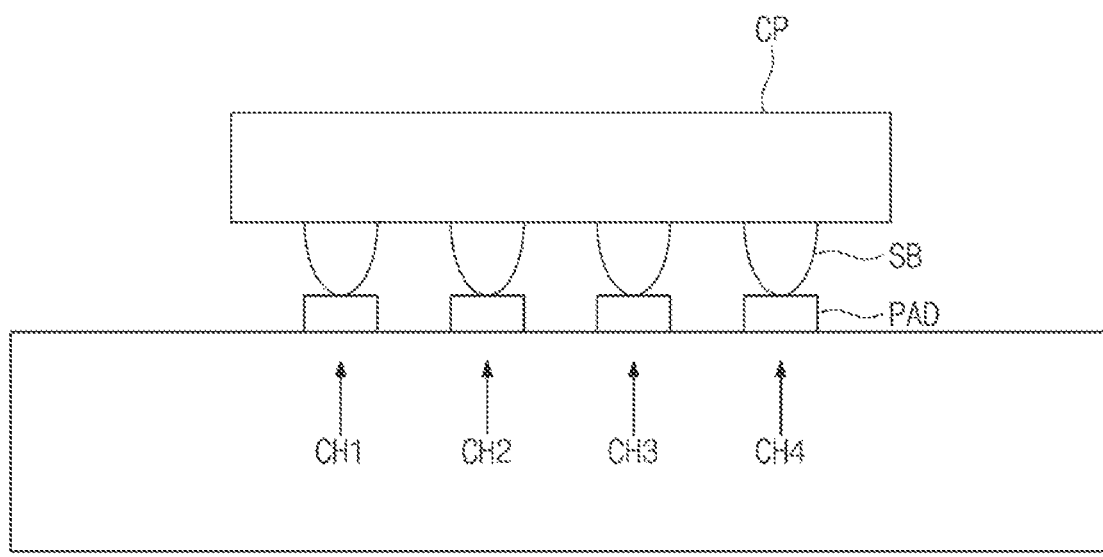
FIG. 3 is a diagram illustrating an example where a controller package is coupled to pads of a controller site according to an example embodiment of the present disclosure.

FIG. 3 is a diagram illustrating an example where the controller package CP is coupled to the pads PAD of the controller site CS according to an example embodiment of the present disclosure. Referring to FIGS. 1, 2, and 3, solder balls SB of the first to fourth channels CH1 to CH4 associated with the controller package CP may be respectively coupled to the pads PAD of the first to fourth channels CH1 to CH4 associated with the controller site CS. The controller package CP may have the ballmap defined by the standard or the manufacturer. The printed circuit board 110 may be manufactured depending on the ballmap defined by the standard or the manufacturer.

The controller package CP may perform the independent control and access on the nonvolatile memory chips NVM of the first to fourth channels CH1 to CH4 through the solder balls SB and the pads PAD of the first to fourth channels CH1 to CH4.

Figure 4:
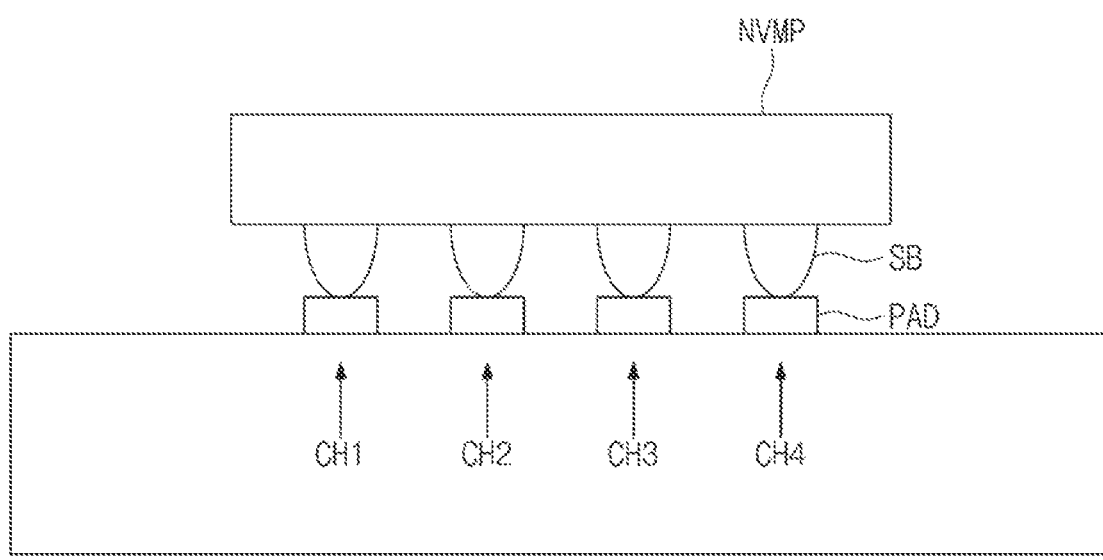
FIG. 4 is a diagram illustrating an example where a nonvolatile memory package is coupled to pads of a first memory site according to an example embodiment of the present disclosure.

FIG. 4 is a diagram illustrating an example where the nonvolatile memory package NVMP is coupled to the pads PAD of the first memory site MS1 according to an example embodiment of the present disclosure. Referring to FIGS. 1, 2, and 4, solder balls SB of the first to fourth channels CH1 to CH4 associated with the nonvolatile memory package NVMP may be respectively coupled to the pads PAD of the first to fourth channels CH1 to CH4 associated with the first memory site MS1. The nonvolatile memory package NVMP may have the ballmap defined by the standard or the manufacturer. The printed circuit board 110 may be manufactured depending on the ballmap defined by the standard or the manufacturer.

The nonvolatile memory package NVMP may accept the control of the first to fourth channels CH1 to CH4 from the controller package CP through the solder balls SB and the pads PAD of the first to fourth channels CH1 to CH4.

Figure 5:
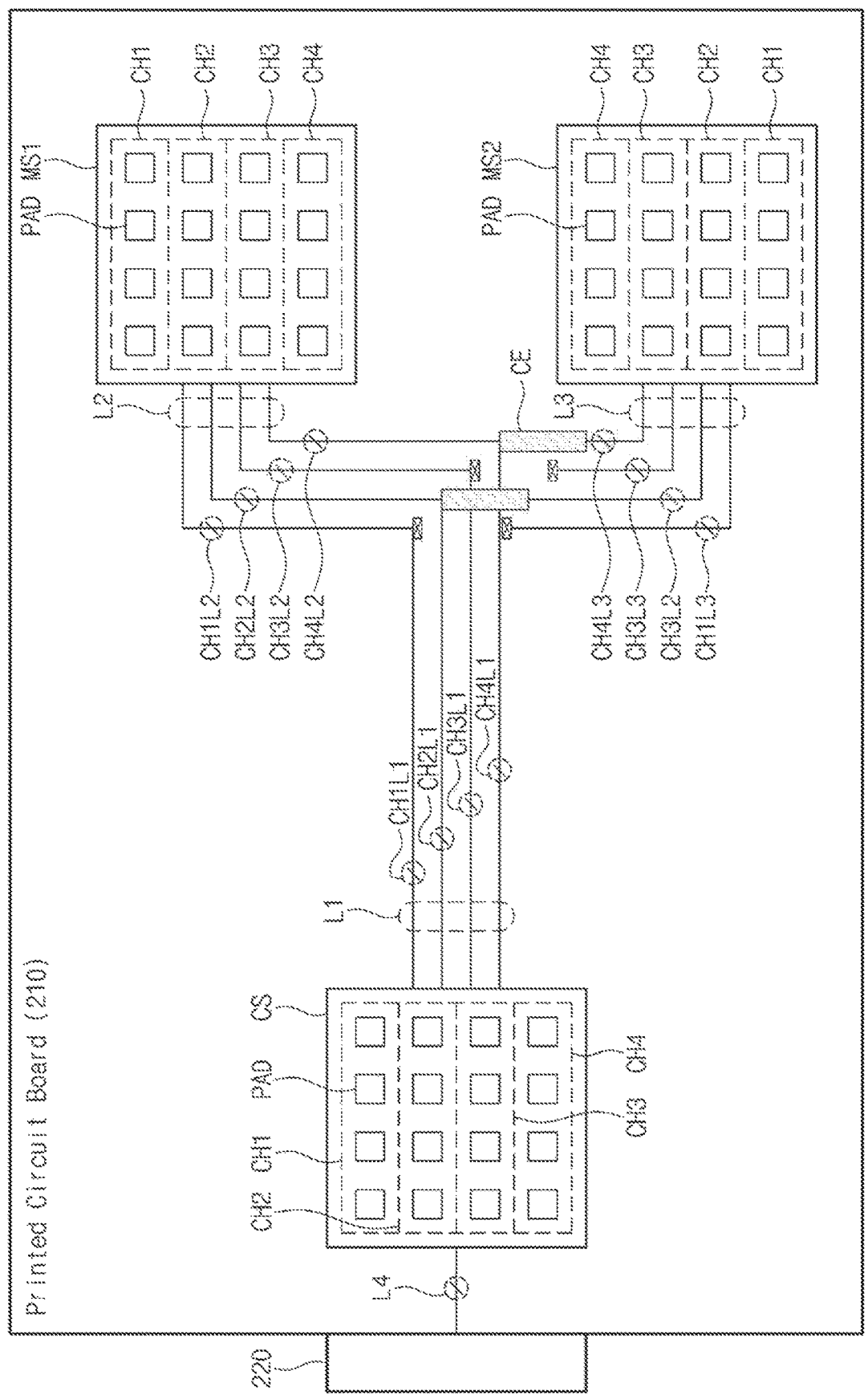
FIG. 5 is a diagram illustrating a printed circuit board of a storage device according to an example embodiment of the present disclosure.

FIG. 5 is a diagram illustrating a printed circuit board 210 of a storage device according to an example embodiment of the present disclosure. Referring to FIG. 5, the printed circuit board 210 may include the controller site CS, the first memory site MS1, the second memory site MS2, the first conductive lines L1, the second conductive lines L2, the third conductive lines L3, and the fourth conductive lines L4. The printed circuit board 210 may be connected with a connector 220.

Compared to the printed circuit board 110 of FIG. 1, some of the conductive elements CE on the printed circuit board 210 of FIG. 5 may be removed. The conductive elements CE may electrically connect some CH2L3 and CH4L3 of the third conductive lines L3 with some CH2L1 and CH4L1 of the first conductive lines L1 and some CH2L2 and CH4L2 of the second conductive lines L2.

The first pads that are conductive may be exposed at the ends of the first channel conductive lines CH1L3 of the third conductive lines L3. The second pads that are conductive may be exposed at points where the first channel conductive lines CH1L1 of the first conductive lines L1 and the first channel conductive lines CH1L2 of the second conductive lines L2 are connected with each other.

Some of the conductive elements CE may connect the second channel conductive lines CH2L3 of the third conductive lines L3 with points where the second channel conductive lines CH2L1 of the first conductive lines L1 and the second channel conductive lines CH2L2 of the second conductive lines L2 are connected with each other. The first pads that are conductive may be connected with the ends of the second channel conductive lines CH2L3 of the third conductive lines L3. The second pads that are conductive may be connected at points where the second channel conductive lines CH2L1 of the first conductive lines L1 and the second channel conductive lines CH2L2 of the second conductive lines L2 are connected with each other. Some of the conductive elements CE may be electrically connected with the second channel conductive lines CH2L3 of the third conductive lines L3 through the first pads being conductive, and may be electrically connected at points, at which the second channel conductive lines CH2L1 of the first conductive lines L1 and the second channel conductive lines CH2L2 of the second conductive lines L2 are electrically connected, through the second pads being conductive.

The first pads that are conductive may be exposed at the ends of the third channel conductive lines CH3L3 of the third conductive lines L3. The second pads that are conductive may be exposed at points where the third channel conductive lines CH3L1 of the first conductive lines L1 and the third channel conductive lines CH3L2 of the second conductive lines L2 are connected with each other.

Some of the conductive elements CE may connect the fourth channel conductive lines CH4L3 of the third conductive lines L3 with points where the fourth channel conductive lines CH4L1 of the first conductive lines L1 and the fourth channel conductive lines CH4L2 of the second conductive lines L2 are connected with each other. The first pads that are conductive may be connected with the ends of the fourth channel conductive lines CH4L3 of the third conductive lines L3. The second pads that are conductive may be connected at points where the fourth channel conductive lines CH4L1 of the first conductive lines L1 and the fourth channel conductive lines CH4L2 of the second conductive lines L2 are connected with each other. Some of the conductive elements CE may be electrically connected with the fourth channel conductive lines CH4L3 of the third conductive lines L3 through the first pads being conductive, and may be electrically connected at points, at which the fourth channel conductive lines CH4L1 of the first conductive lines L1 and the fourth channel conductive lines CH4L2 of the second conductive lines L2 are electrically connected, through the second pads being conductive.

The conductive elements CE may be attached on the printed circuit board 210 after conductive pads (e.g., the first and second pads being conductive, which are described above) are manufactured.

Conductive elements of the conductive elements CE electrically connected with the second channel conductive lines CH2L1 of the first conductive lines L1 from may not be electrically connected with the third channel conductive lines CH3L1 and the fourth channel conductive lines CH4L1 of the first conductive lines L1.

The conductive elements CE may be exposed on the printed circuit board 210. A height of upper surfaces of the conductive elements CE (e.g., measured from a surface of the printed circuit board 210) may be higher than a height of upper surfaces of the first conductive lines L1, the second conductive lines L2, and the third conductive lines L3 (e.g., measured from a surface the printed circuit board 110). That is, the conductive elements CE may protrude from the printed circuit board 210.

The printed circuit board 210 may be implemented by removing (or not providing) some of the conductive elements CE of the printed circuit board 110 of FIG. 1. The printed circuit board 210 may be configured to have the conductive line topology different from the conductive line topology of the printed circuit board 110 of FIG. 1 by attaching the conductive elements CE.

In an example embodiment, the conductive elements CE may be conductive elements (e.g., resistors or conductive lines) where the insulation coating is provided at the remaining portions other than terminals electrically connecting some CH2L3 and CH4L3 of the third conductive lines L3 with some CH2L1 and CH4L1 of the first conductive lines L1 and some CH2L2 and CH4L2 of the second conductive lines L2.

In an example embodiment, separate conductive lines that extend from the controller site CS and are directly connected with the first memory site MS1 and/or the second memory site MS2 may be provided on or in the printed circuit board 210.

Figure 6:
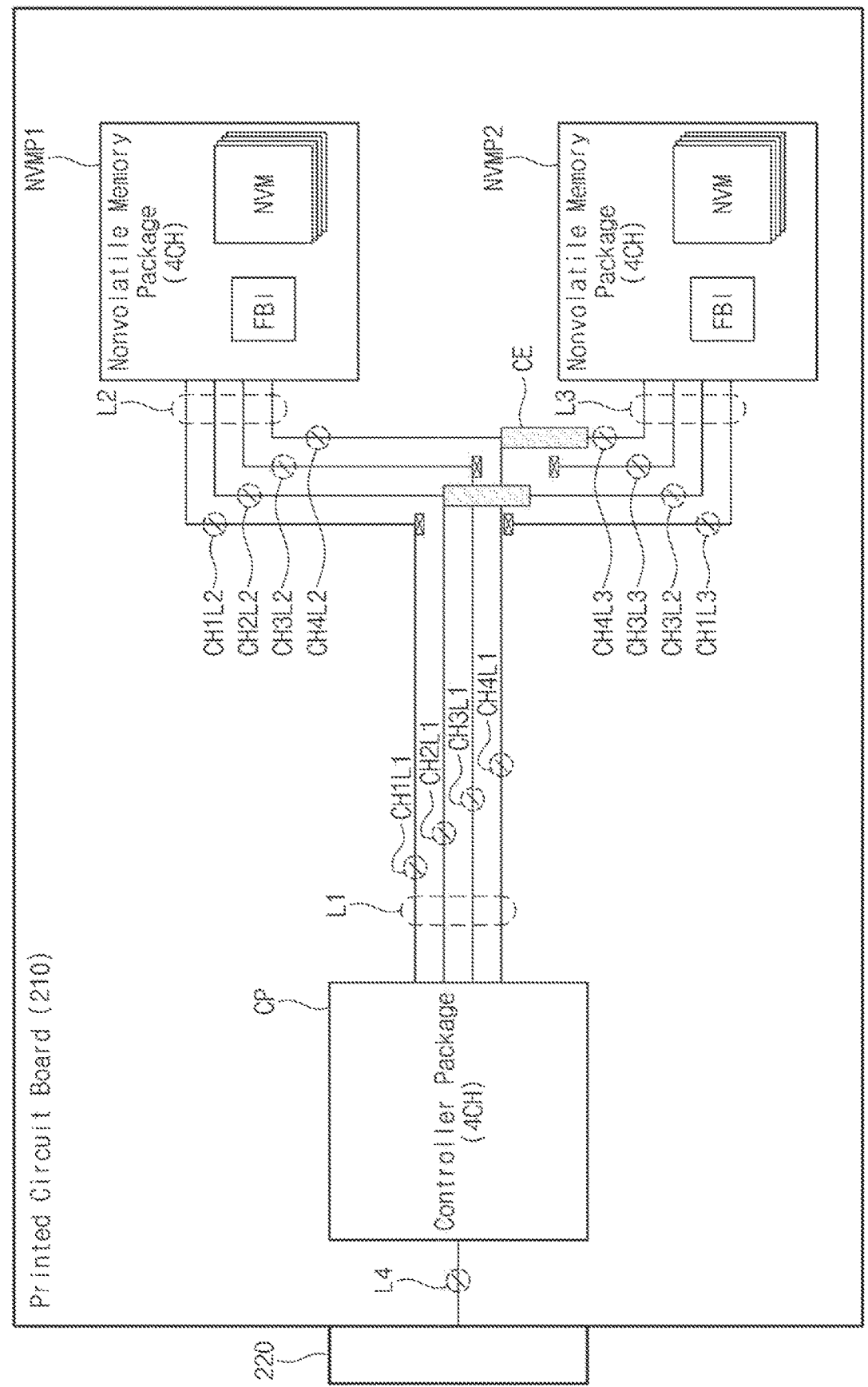
FIG. 6 is a diagram illustrating a storage device according to an example embodiment of the present disclosure.

FIG. 6 is a diagram illustrating a storage device 200 according to an example embodiment of the present disclosure. Referring to FIGS. 5 and 6, the controller package CP may be mounted on the controller site CS of the printed circuit board 210. The first nonvolatile memory package NVMP1 may be mounted on the first memory site MS1 of the printed circuit board 210. The second nonvolatile memory package NVMP2 may be mounted on the second memory site MS2 of the printed circuit board 210.

The storage device 200 may be implemented to include the controller package CP mounted in the controller site CS and the first and second nonvolatile memory packages NVMP1 and NVMP2 respectively mounted in the two memory sites MS1 and MS2. However example embodiments of the present disclosure is not limited to FIG. 6. The storage device 200 may be implemented to include a controller package mounted in one controller site and memory packages mounted in at least some of a plurality of memory sites, and some of conductive lines connected with the memory sites may be physically and electrically separated from conductive lines connected with the controller package. Conductive lines of memory sites where memory packages are not used may be implemented to be separated (physically and electrically) from the conductive lines connected with the controller package.

The controller package CP may access the first nonvolatile memory package NVMP1 through a plurality of channels, for example, the first and third channels CH1 and CH3. That is, the controller package CP may access the first nonvolatile memory package NVMP1 by using some of the conductive lines L1 and L2 connected with the first nonvolatile memory package NVMP1. The controller package CP may access the second nonvolatile memory package NVMP2 through a plurality of channels, for example, the second and fourth channels CH2 and CH4.

The first nonvolatile memory package NVMP1 may include a frequency boosting interface chip FBI and a plurality of nonvolatile memory chips NVM. The frequency boosting interface chip FBI may be electrically connected with the first channel conductive lines CH1L2 and the third channel conductive lines CH3L2 of the second conductive lines L2. The frequency boosting interface chip FBI may support the independent (or parallel) access through the first channel CH1 and the third channel CH3.

The plurality of nonvolatile memory chips NVM may be connected with the frequency boosting interface chip FBI. The plurality of nonvolatile memory chips NVM may correspond to the first channel CH1 and the third channel CH3. The frequency boosting interface chip FBI may access the nonvolatile memory chips NVM of the first channel CH1 and the nonvolatile memory chips NVM of the third channel CH3 independently (or in parallel). The frequency boosting interface chip FBI may improve a frequency of signals transferred through the first channel CH1 and the third channel CH3 by supporting signal retiming, impedance reduction, etc.

The second nonvolatile memory package NVMP2 may include a frequency boosting interface chip FBI and a plurality of nonvolatile memory chips NVM. The frequency boosting interface chip FBI may be electrically connected with the second channel conductive lines CH2L2 and the fourth channel conductive lines CH4L2 of the second conductive lines L2. The frequency boosting interface chip FBI may support the independent (or parallel) access through the second channel CH2 and the fourth channel CH4.

The controller package CP may access the nonvolatile memory chips NVM of the first to fourth channels CH1 to CH4 independently of each other (or in parallel). For example, the controller package CP may access the nonvolatile memory chips NVM of the first nonvolatile memory package NVMP1, which belong to the first channel CH1, through the pads PAD of the controller package CP belonging to the first channel CH1, the first channel conductive lines CH1L1 of the first conductive lines L1, the first channel conductive lines CH1L2 of the second conductive lines L2, and the pads PAD of the first memory site MS1 belonging to the first channel CH1.

The controller package CP may access the nonvolatile memory chips NVM of the second nonvolatile memory package NVMP2, which belong to the second channel CH2, through the pads PAD of the controller site CS belonging to the second channel CH2, the second channel conductive lines CH2L1 of the first conductive lines L1, conductive elements of the conductive elements CE connected with the second channel conductive lines CH2L1 of the first conductive lines L1, the second channel conductive lines CH2L3 of the third conductive lines L3, and the pads PAD of the second memory site MS2 belonging to the second channel CH2.

The controller package CP may access the nonvolatile memory chips NVM of the first nonvolatile memory package NVMP1, which belong to the third channel CH3, through the pads PAD of the controller site CS belonging to the third channel CH3, the third channel conductive lines CH3L1 of the first conductive lines L1, the third channel conductive lines CH3L2 of the second conductive lines L2, and the pads PAD of the first memory site MS1 belonging to the third channel CH3.

The controller package CP may access the nonvolatile memory chips NVM of the second nonvolatile memory package NVMP2, which belong to the fourth channel CH4, through the pads PAD of the controller site CS belonging to the fourth channel CH4, the fourth channel conductive lines CH4L1 of the first conductive lines L1, conductive elements of the conductive elements CE connected with the fourth channel conductive lines CH4L1 of the first conductive lines L1, the fourth channel conductive lines CH4L3 of the third conductive lines L3, and the pads PAD of the second memory site MS2 belonging to the fourth channel CH4. As illustrated in FIG. 6, the first channel conductive lines CH1L3 and the third channel conductive lines CH3L3 of the third conductive lines L3 may not be used in the second nonvolatile memory package NVMP2. As the first channel conductive lines CH1L3 and the third channel conductive lines CH3L3 of the third conductive lines L3 are not used and left alone without the electrical connection with the first conductive lines L1 or the second conductive lines L2, the signal integrity (SI) may be prevented from being reduced due to the electrical connection of the first channel conductive lines CH1L3 and the third channel conductive lines CH3L3 of the third conductive lines L3.

The nonvolatile memory chips NVM may include NAND flash memories. The pads and conductive lines of each of the first to fourth channels CH1 to CH4 may be configured to transfer data signals, a data strobe signal that provides the timing to latch the data signals transferring data, an address, or a command, a read enable signal that allows the NAND flash memory to generate the data strobe signal, a write enable signal that provides the timing to latch an address or a command, a command latch enable signal indicating that the data signals are commands, an address latch enable signal indicating that the data signals are an address, a chip enable signal indicating a target to be accessed from among the nonvolatile memory chips NVM, a data bus inversion signal indicating whether data are in an inverted state, a reset signal, an on-die termination signal, and a ready/busy signal.

In an example embodiment, the data signals, the data strobe signal, the read enable signal, and the data bus inversion signal may be high-speed signals that toggle at high speed. The address latch enable signal, the command latch enable signal, the write enable signal, the reset signal, the on-die termination signal, the ready/busy signal, and the chip enable signal may be low-speed signals that toggle at low speed.

The high-speed signals may be transferred to the first nonvolatile memory package NVMP1 and the second nonvolatile memory package NVMP2 through the first conductive lines L1, the second conductive lines L2, the third conductive lines L3, and the conductive elements CE as illustrated in FIG. 6. The low-speed signals may be transferred through separate conductive lines of the printed circuit board 110, which are directly connected between the controller package CP and the first nonvolatile memory package NVMP1 and/or the second nonvolatile memory package NVMP2.

Below, the description associated with signals transferred through the first conductive lines L1, the second conductive lines L2, the third conductive lines L3, and the conductive elements CE and signals transferred through separate conductive lines will be omitted. However, features of the above signals may be applied in common to example embodiments of the present disclosure.

As described with reference to FIG. 3, the controller package CP may be mounted in the printed circuit board 210. As described with reference to FIG. 4, the first and second nonvolatile memory packages NVMP1 and NVMP2 may be mounted in a printed circuit board, but may have features distinguishable from those described with reference to FIG. 4.

Figure 7:
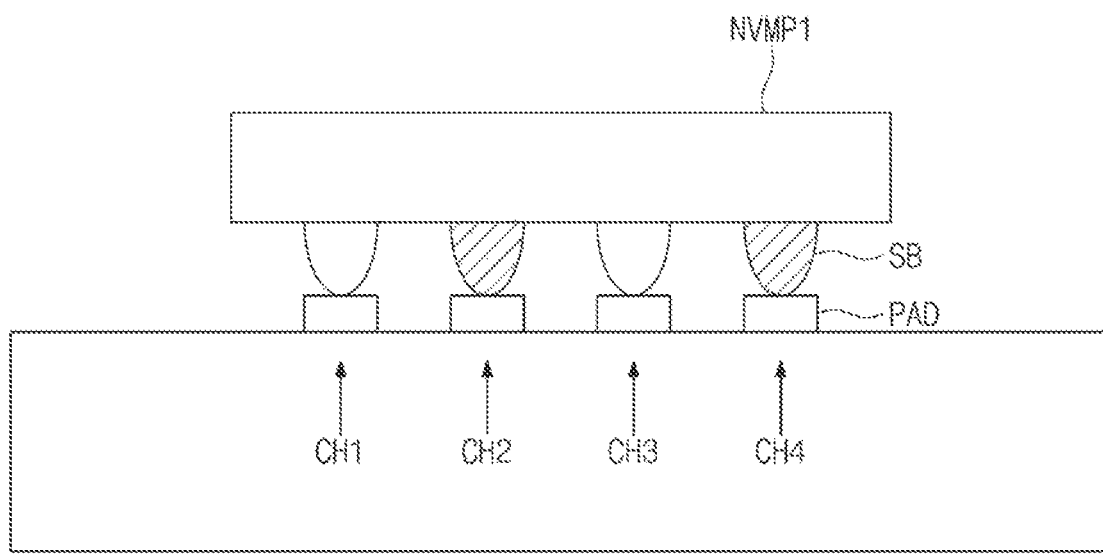
FIG. 7 is a diagram illustrating a feature of a first nonvolatile memory package according to an example embodiment of the present disclosure.

FIG. 7 is a diagram illustrating a feature of the first nonvolatile memory package NVMP1 according to an example embodiment of the present disclosure. Referring to FIGS. 6 and 7, the first nonvolatile memory package NVMP1 may transfer signals through the pads PAD of the first channel CH1 and the third channel CH3. The first nonvolatile memory package NVMP1 may not transfer signals through the pads PAD of the second channel CH2 and the fourth channel CH4. The pads PAD of the second channel CH2 and the fourth channel CH4 of the first nonvolatile memory package NVMP1 may be dummy pads. The pads PAD of the second channel CH2 and the fourth channel CH4 of the first nonvolatile memory package NVMP1 may not be connected with the frequency boosting interface chip FBI of the first nonvolatile memory package NVMP1.

Figure 8:
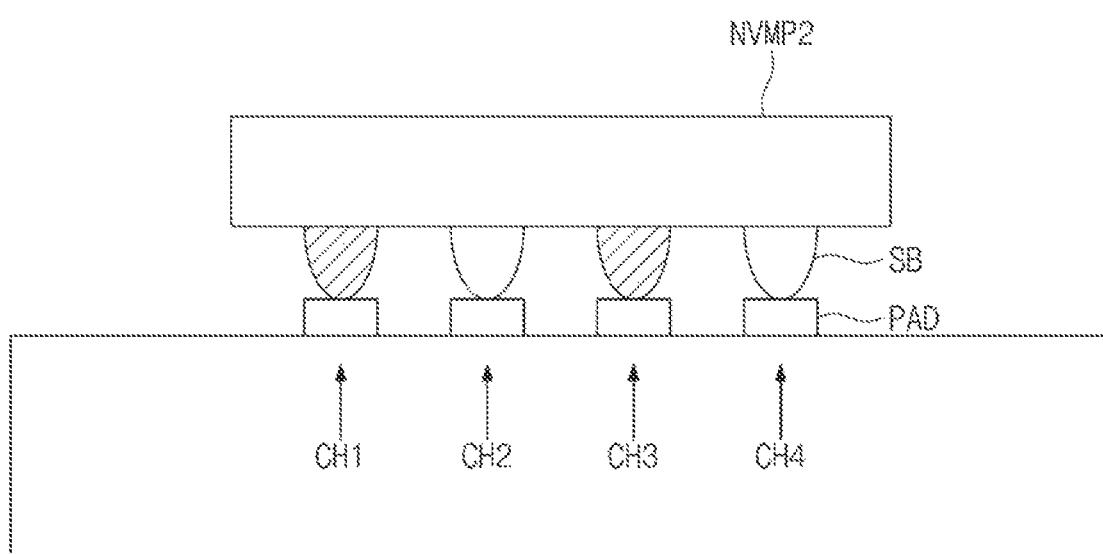
FIG. 8 is a diagram illustrating a feature of a second nonvolatile memory package according to an example embodiment of the present disclosure.

FIG. 8 is a diagram illustrating a feature of the second nonvolatile memory package NVMP2 according to an example embodiment of the present disclosure. Referring to FIGS. 6 and 8, the second nonvolatile memory package NVMP2 may transfer signals through the pads PAD of the second channel CH2 and the fourth channel CH4. The second nonvolatile memory package NVMP2 may not transfer signals through the pads PAD of the first channel CH1 and the third channel CH3. The pads PAD of the first channel CH1 and the third channel CH3 of the second nonvolatile memory package NVMP2 may be dummy pads. The pads PAD of the first channel CH1 and the third channel CH3 of the second nonvolatile memory package NVMP2 may not be connected with the frequency boosting interface chip FBI of the second nonvolatile memory package NVMP2.

Figure 9:
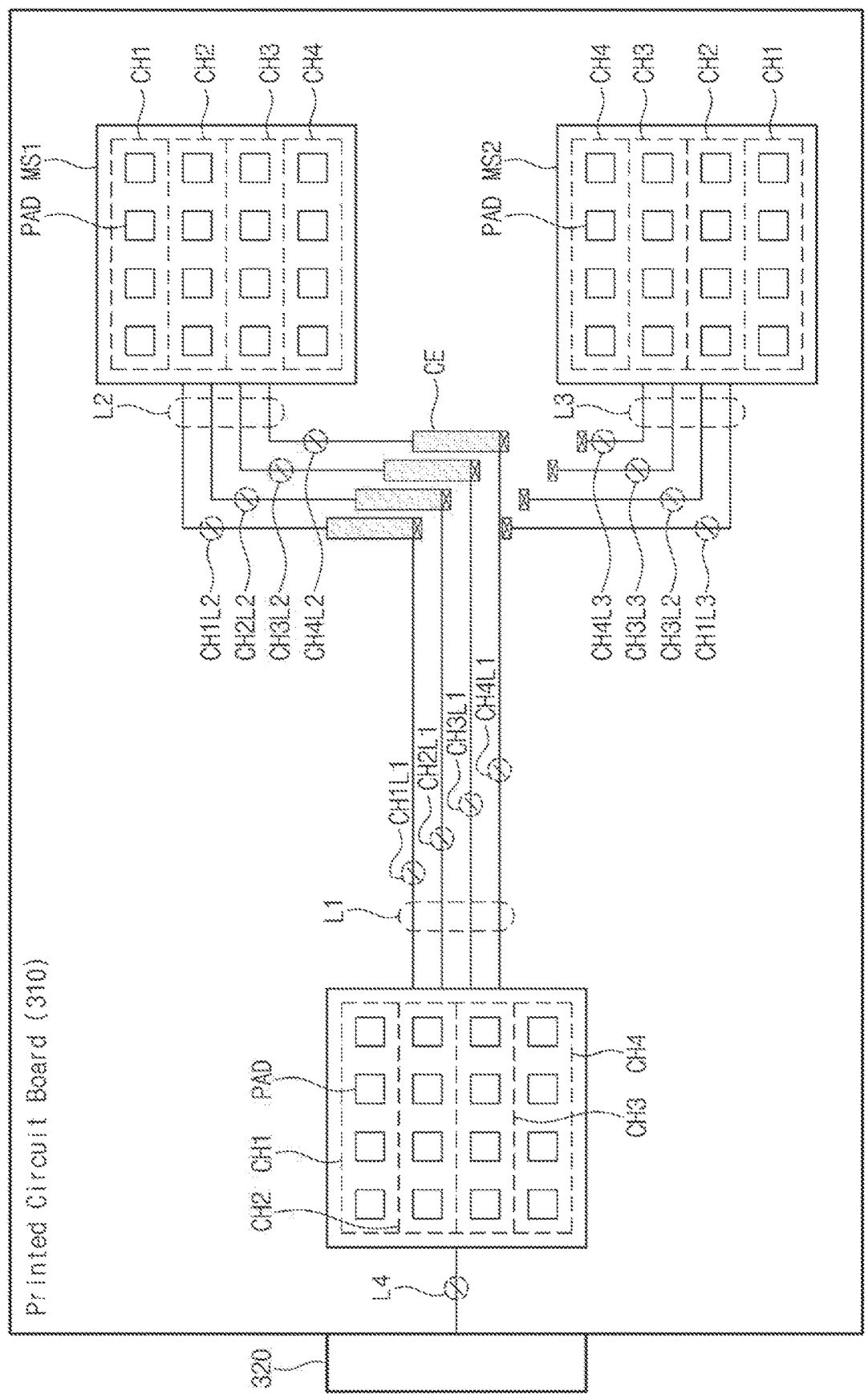
FIG. 9 is a diagram illustrating a printed circuit board of a storage device according to an example embodiment of the present disclosure.

FIG. 9 is a diagram illustrating a printed circuit board 310 of a storage device according to an example embodiment of the present disclosure. Referring to FIG. 9, the printed circuit board 310 may include the controller site CS, the first memory site MS1, the third conductive lines L3, and the fourth conductive lines L4. The printed circuit board 310 may be connected with a connector 320.

The first conductive lines L1 may be physically separated from the second conductive lines L2 and the third conductive lines L3. First pads (i.e., that would be covered by the conductive elements CE) that are conductive and correspond to the second conductive lines L2 and second pads that are conductive and correspond to the third conductive lines L3 may be connected with the ends of the first conductive lines L1. Third pads (i.e., that would be covered by the conductive elements CE) that are conductive may be connected with the ends of the second conductive lines L2. Fourth pads that are conductive may be connected with the ends of the third conductive lines L3. The conductive elements CE may be attached to the first and third pads being conductive to electrically connect the first conductive lines L1 and the second conductive lines L2. The second and fourth pads being conductive may be exposed on the printed circuit board 310.

Figure 10:
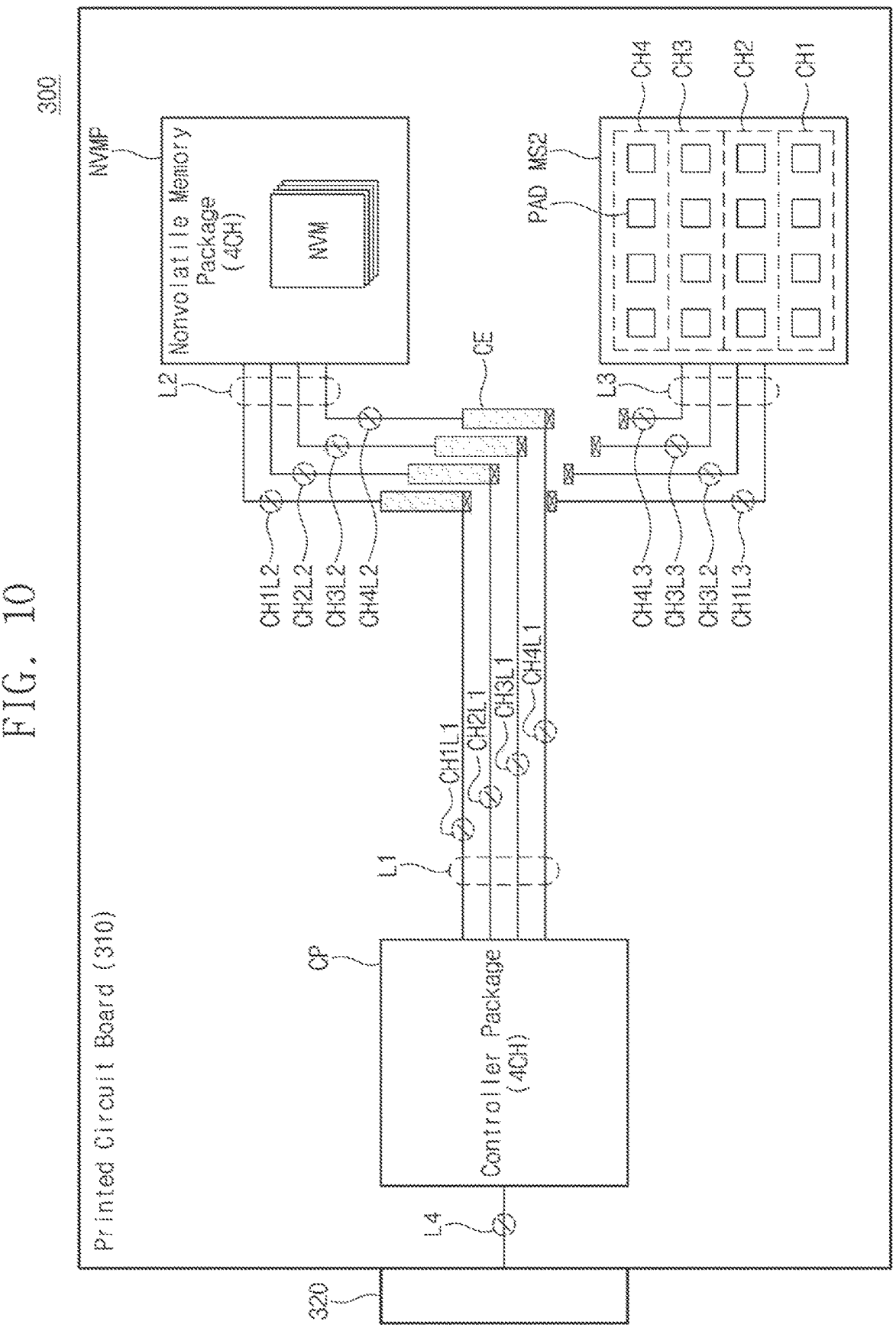
FIG. 10 is a diagram illustrating a storage device according to an example embodiment of the present disclosure.

FIG. 10 is a diagram illustrating a storage device 300 according to an example embodiment of the present disclosure. Referring to FIGS. 9 and 10, the controller package CP may be mounted on the controller site CS of the printed circuit board 310. The nonvolatile memory package NVMP may be mounted on the first memory site MS1 of the printed circuit board 310. Any package may not be mounted on the second memory site MS2 of the printed circuit board 310.

The first conductive lines L1 may be exposed to the outside on the printed circuit board 310. The second conductive lines L2 may be exposed to the outside on the printed circuit board 310. The third conductive lines L3 may be exposed to the outside on the printed circuit board 310. The pads PAD of the second memory site MS2 may be exposed to the outside on the printed circuit board 310. The conductive elements CE may be exposed to the outside on the printed circuit board 310.

The storage device 300 may be implemented to include the controller package CP mounted in the controller site CS and the nonvolatile memory package NVMP mounted in one MS1 of the two memory sites MS1 and MS2. However, example embodiments of the present disclosure is not limited to FIG. 10. The storage device 300 may be implemented to include a controller package mounted in one controller site and memory packages mounted in some of a plurality of memory sites, and conductive lines of memory sites where memory packages are not used may be implemented to be (physically and electrically) separated from conductive lines connected with the controller package.

The controller package CP may access the nonvolatile memory package NVMP through a plurality of channels, for example, the first to fourth channels CH1 to CH4. The nonvolatile memory package NVMP may include a plurality of nonvolatile memory chips NVM respectively corresponding to the first to fourth channels CH1 to CH4. One channel may correspond to one or more nonvolatile memory chips NVM.

The controller package CP may access the nonvolatile memory chips NVM of the first to fourth channels CH1 to CH4 independently of each other (or in parallel). For example, the controller package CP may access the nonvolatile memory chips NVM of the first channel CH1 through the pads PAD of the controller site CS belonging to the first channel CH1, the first channel conductive lines CH1L1 of the first conductive lines L1, the first channel conductive lines CH1L2 of the second conductive lines L2, and the pads PAD of the first memory site MS1 belonging to the first channel CH1.

Likewise, the controller package CP may access the nonvolatile memory chips NVM of the k-th channel (k being a positive integer) through the pads PAD of the controller site CS belonging to the k-th channel, the k-th channel conductive lines of the first conductive lines L1, the k-th channel conductive lines of the second conductive lines L2, and the pads PAD of the first memory site MS1 belonging to the k-th channel.

The nonvolatile memory chips NVM may include NAND flash memories. The pads and conductive lines of each of the first to fourth channels CH1 to CH4 may be configured to transfer data signals, a data strobe signal that provides the timing to latch the data signals transferring data, an address, or a command, a read enable signal that allows the NAND flash memory to generate the data strobe signal, a write enable signal that provides the timing to latch an address or a command, a command latch enable signal indicating that the data signals are commands, an address latch enable signal indicating that the data signals are an address, and a chip enable signal indicating a target to be accessed from among the nonvolatile memory chips NVM.

As illustrated in FIG. 10, in the case where the nonvolatile memory package NVMP is not mounted in some (e.g., MS2) of the memory sites MS1 and MS2 of the storage device 300, conductive lines connected with some (e.g., MS2) of the memory sites MS1 and MS2 may be left alone in a state of being physically and electrically separated from the first conductive lines L1 connected with the controller package CP. Accordingly, the third conductive lines L3 connected with the left-alone memory site MS2 may not affect the signal transfer between the controller package CP and the nonvolatile memory package NVMP. For example, the signal reflection and the signal attenuation may be prevented from being caused by the third conductive lines L3 connected with the left-alone memory site MS2. Accordingly, the integrity of signals that are exchanged between the controller package CP and the nonvolatile memory package NVMP. That is, the SI may be improved.

The controller package CP may be connected with an external host device through the fourth conductive lines L4 and the connector 320. Signals that are transferred through the fourth conductive lines L4 may be different from signals that are transferred through the first conductive lines L1. For example, unlike the above signals, the controller package CP may exchange signals with the external host device through the fourth conductive lines L4 and the connector 320 based on PCIe or NVMe.

In an example embodiment, the storage device 300 may be implemented with a SSD, a SCM, a removable memory, a memory expander, etc.

Figure 11:
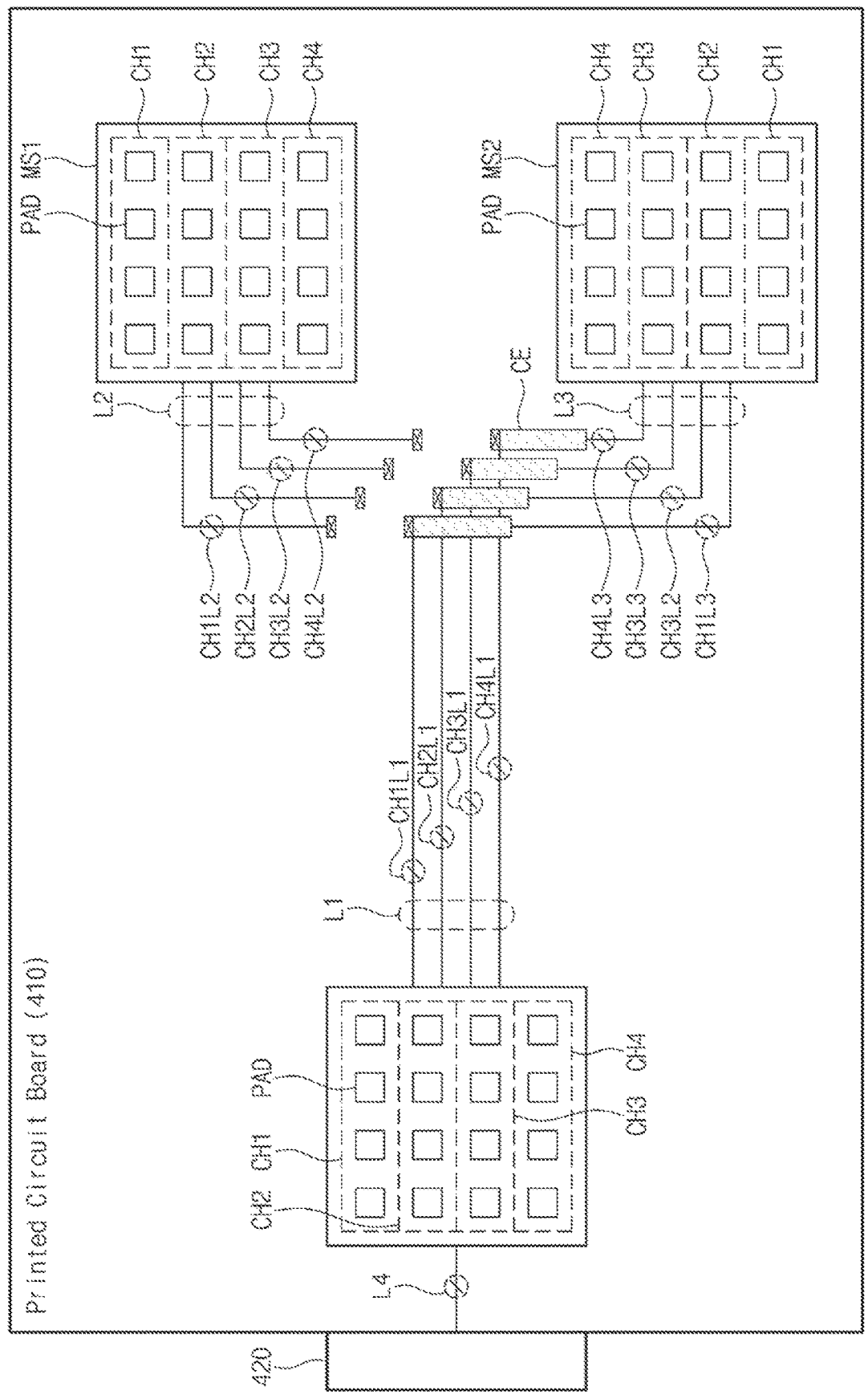
FIG. 11 is a diagram illustrating a printed circuit board of a storage device according to an example embodiment of the present disclosure.
Figure 14:
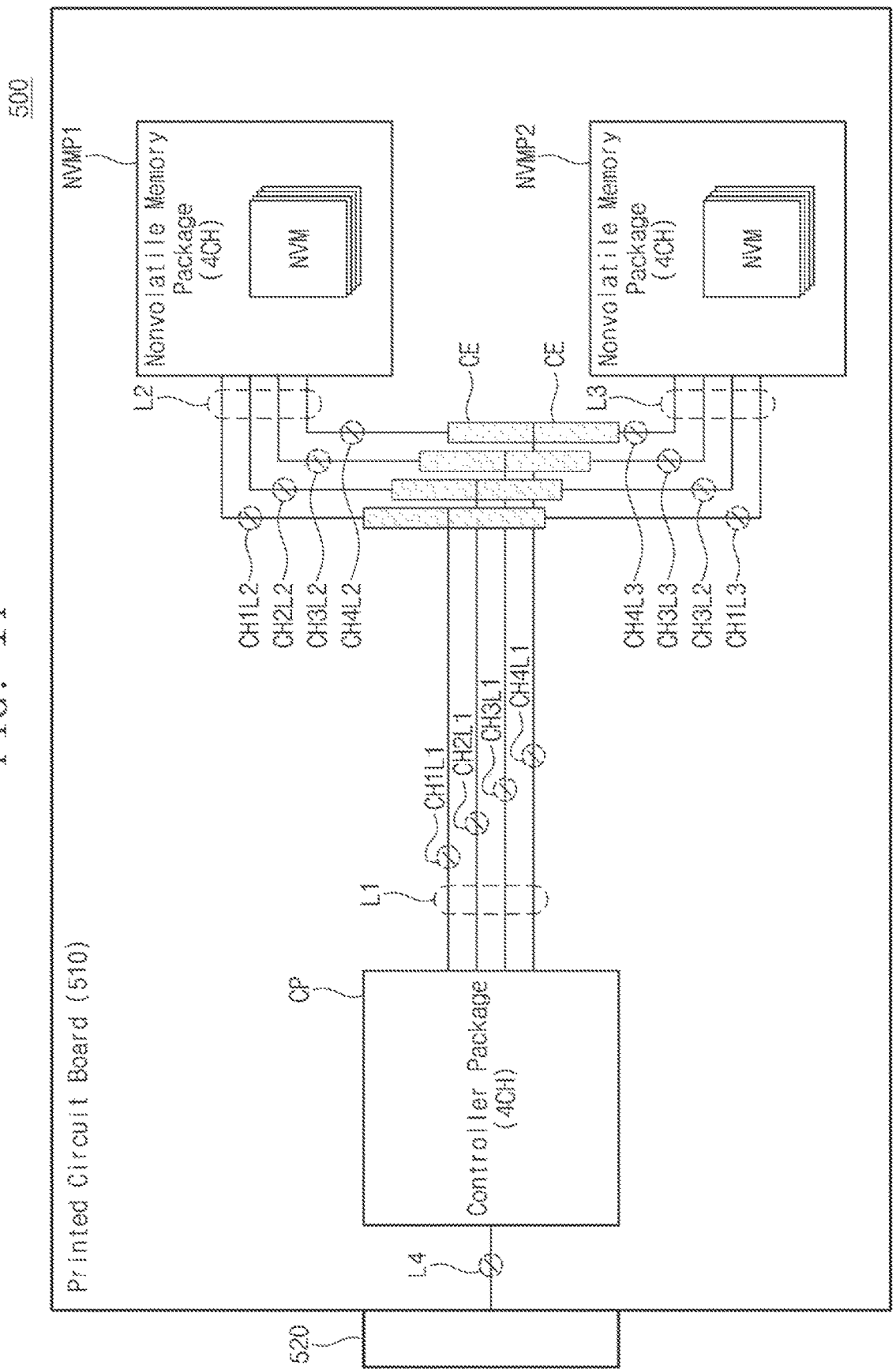
FIG. 14 is a diagram illustrating a storage device according to an example embodiment of the present disclosure.

FIG. 11 is a diagram illustrating a printed circuit board 410 of a storage device according to an example embodiment of the present disclosure. Referring to FIG. 14, the printed circuit board 410 may include the controller site CS, the first memory site MS1, the second memory site MS2, the first conductive lines L1, the second conductive lines L2, the third conductive lines L3, and the fourth conductive lines L4. The printed circuit board 410 may be connected with a connector 420.

The first conductive lines L1 may be physically separated from the second conductive lines L2 and the third conductive lines L3. First pads that are conductive and correspond to the second conductive lines L2 and second pads (i.e., that would be covered by the conductive elements CE) that are conductive and correspond to the third conductive lines L3 may be connected with the ends of the first conductive lines L1. Third pads that are conductive may be connected with the ends of the second conductive lines L2. Fourth pads (i.e., that would be covered by the conductive elements CE) that are conductive may be connected with the ends of the third conductive lines L3. The conductive elements CE may be attached to the second and fourth pads being conductive to electrically connect the first conductive lines L1 and the third conductive lines L3. The first and third pads being conductive may be exposed on the printed circuit board 310.

Figure 12:
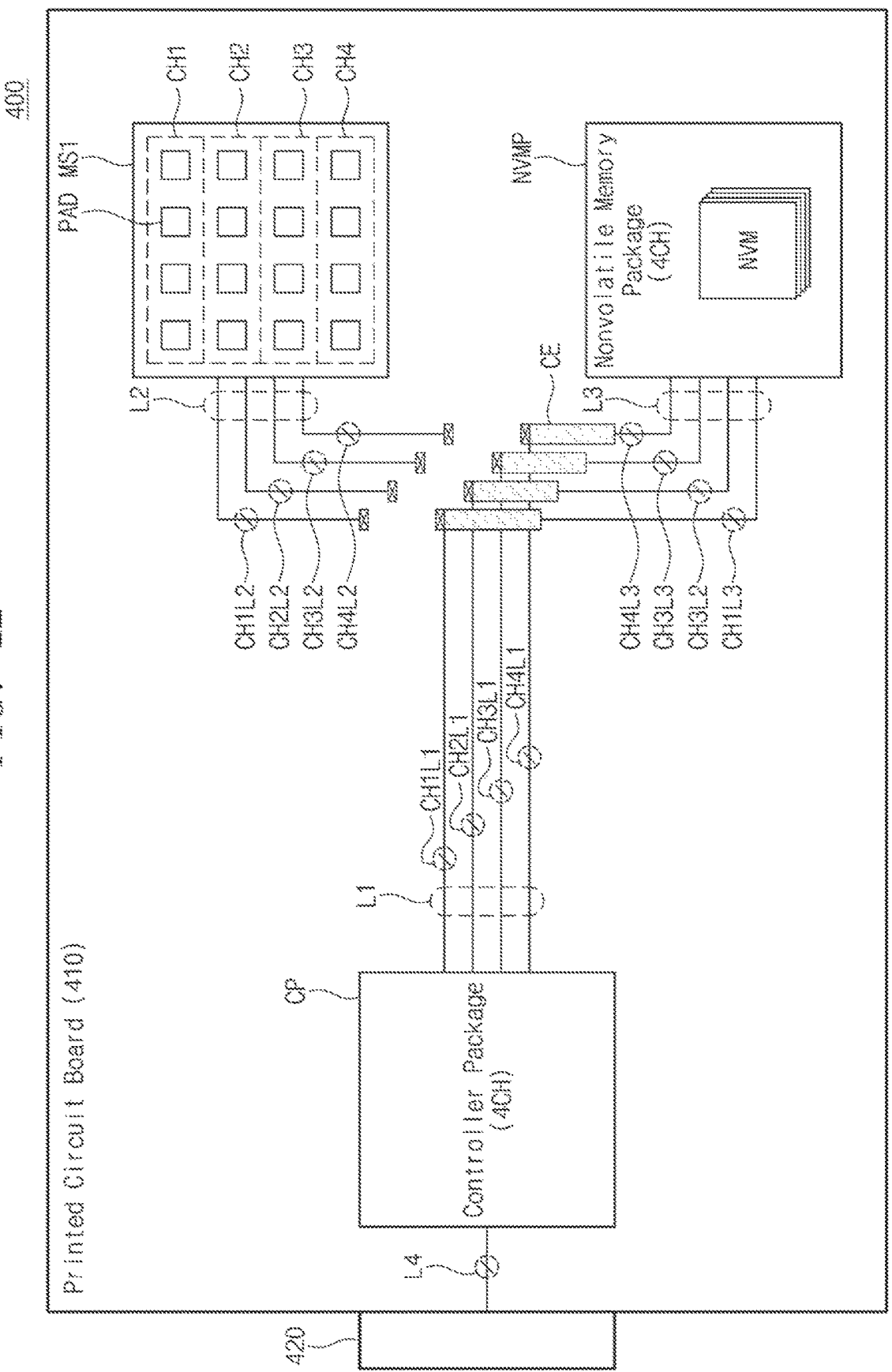
FIG. 12 is a diagram illustrating a storage device according to an example embodiment of the present disclosure.

FIG. 12 is a diagram illustrating a storage device 400 according to an example embodiment of the present disclosure. Referring to FIGS. 11 and 12, the controller package CP may be mounted on the controller site CS of the printed circuit board 410. The nonvolatile memory package NVMP may be mounted on the second memory site MS2 of the printed circuit board 410. Any package may not be mounted on the first memory site MS1 of the printed circuit board 410.

A configuration of the storage device 400 may be similar to the configuration of the storage device 300 of FIG. 10 except that the nonvolatile memory package NVMP is mounted in the second memory site MS2 instead of the first memory site MS1. Thus, additional description will be omitted to avoid redundancy. The description is given with reference to the storage device 300 of FIG. 10, but features that are not mentioned or are not otherwise mentioned in the storage device 400 of FIG. 12 may be identically applied to the storage device 400 of FIG. 12.

Figure 13:
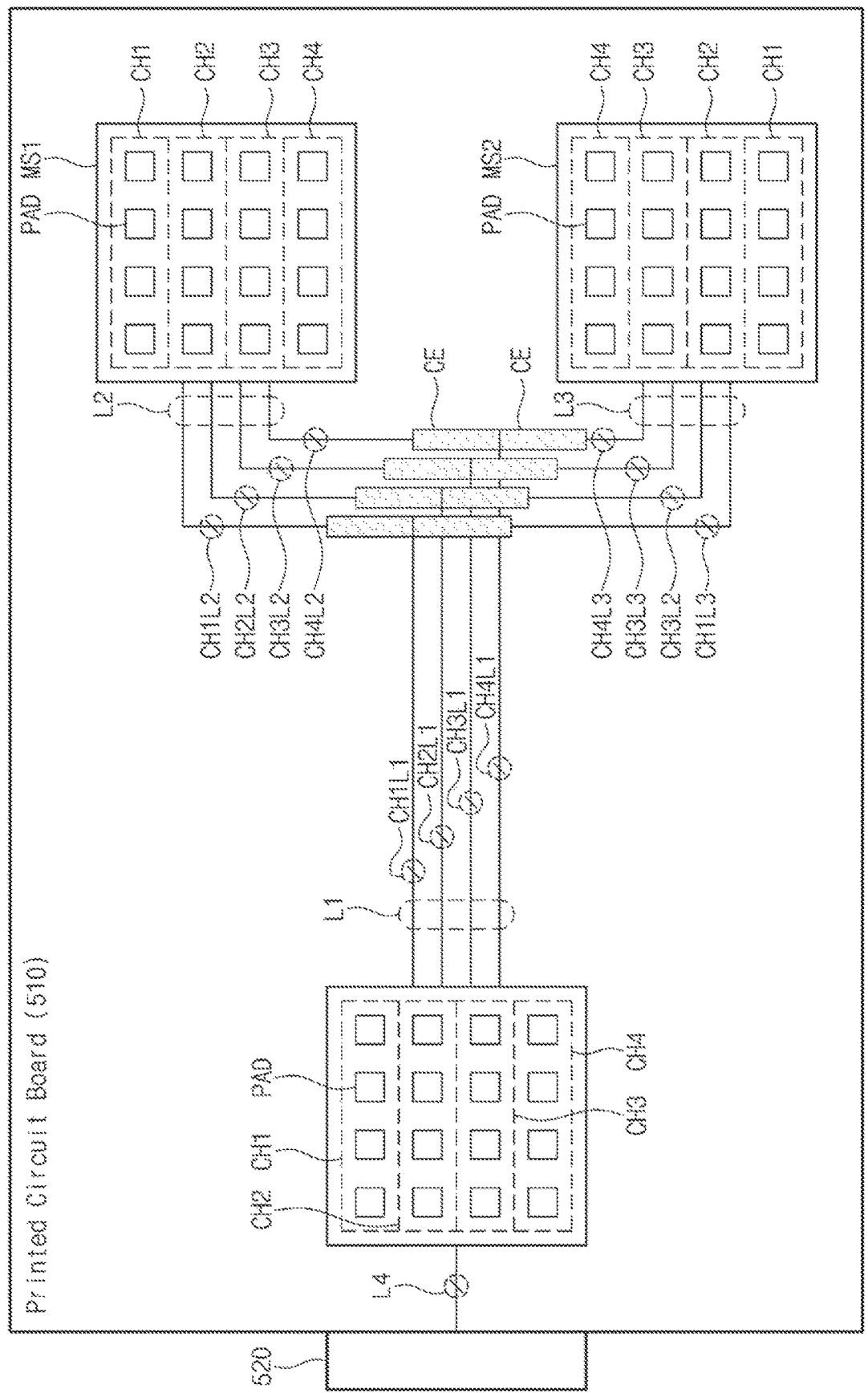
FIG. 13 is a diagram illustrating a printed circuit board of a storage device according to an example embodiment of the present disclosure.

FIG. 13 is a diagram illustrating a printed circuit board 510 of a storage device according to an example embodiment of the present disclosure. Referring to FIG. 13, the printed circuit board 510 may include the controller site CS, the first memory site MS1, the second memory site MS2, the first conductive lines L1, the second conductive lines L2, the third conductive lines L3, and the fourth conductive lines L4. The printed circuit board 510 may be connected with a connector 520.

The first conductive lines L1 may be physically separated from the second conductive lines L2 and the third conductive lines L3. First pads (i.e., that would be covered by the conductive elements CE) that are conductive and correspond to the second conductive lines L2 and second pads (i.e., that would be covered by the conductive elements CE) that are conductive and correspond to the third conductive lines L3 may be connected with the ends of the first conductive lines L1. Third pads (i.e., that would be covered by the conductive elements CE) that are conductive may be connected with the ends of the second conductive lines L2. Fourth pads (i.e., that would be covered by the conductive elements CE) that are conductive may be connected with the ends of the third conductive lines L3. The conductive elements CE may be attached to the first and third pads being conductive to electrically connect the first conductive lines L1 and the second conductive lines L2. Also, the conductive elements CE may be attached to the second and fourth pads being conductive to electrically connect the first conductive lines L1 and the third conductive lines L3.

FIG. 14 is a diagram illustrating a storage device 500 according to an example embodiment of the present disclosure. Referring to FIGS. 13 and 14, the controller package CP may be mounted on the controller site CS of the printed circuit board 510. The first nonvolatile memory package NVMP1 may be mounted on the first memory site MS1 of the printed circuit board 510. The second nonvolatile memory package NVMP2 may be mounted on the second memory site MS2 of the printed circuit board 510.

A configuration of the storage device 500 may be similar to the configuration of the storage device 200 of FIG. 2. Thus, additional description will be omitted to avoid redundancy. The description is given with reference to the storage device 200 of FIG. 2, but features that are not mentioned or are not otherwise mentioned in the storage device 500 of FIG. 14 may be identically applied to the storage device 500 of FIG. 14.

Figure 15:
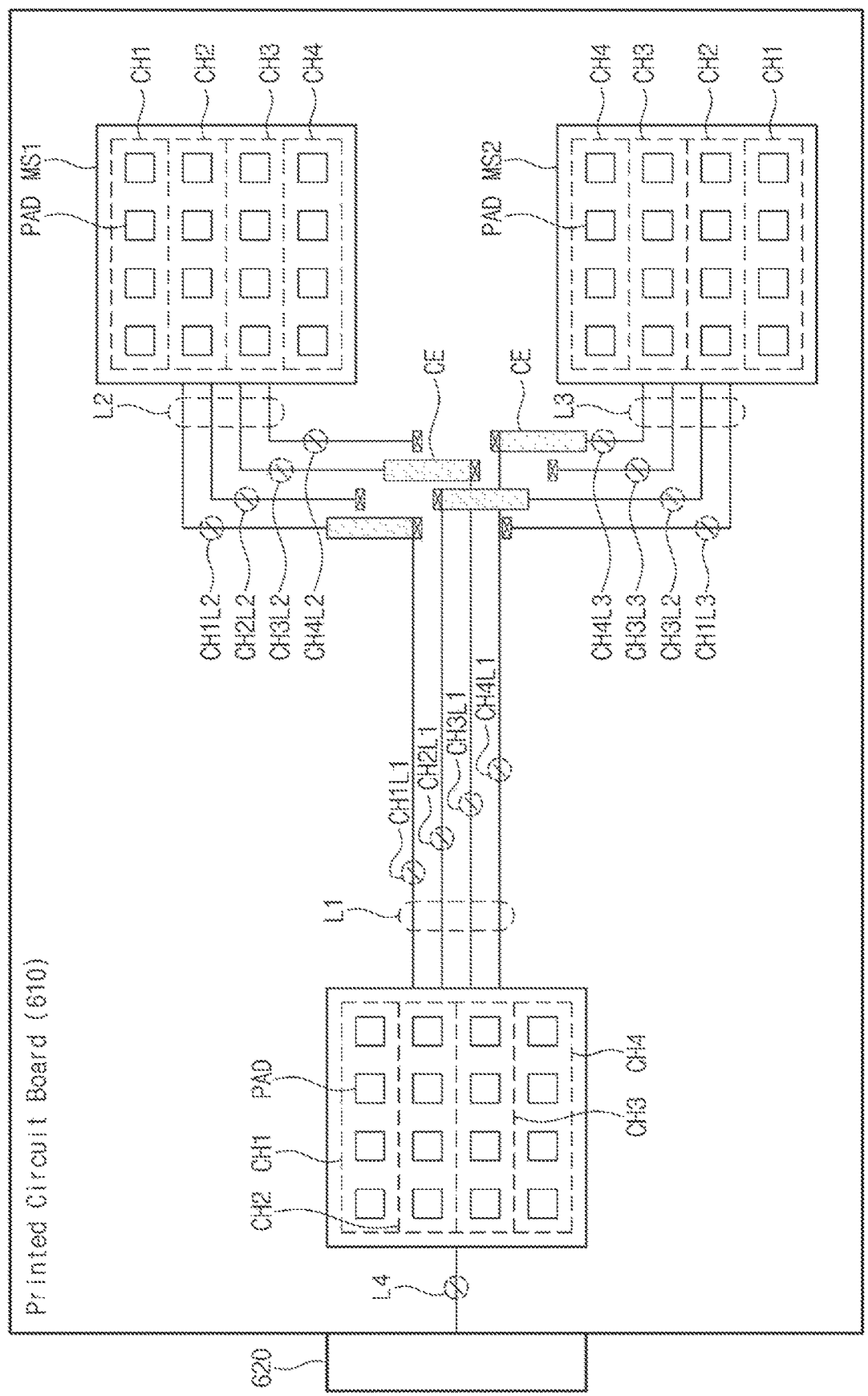
FIG. 15 is a diagram illustrating a printed circuit board of a storage device according to an example embodiment of the present disclosure.

FIG. 15 is a diagram illustrating a printed circuit board 610 of a storage device according to an example embodiment of the present disclosure. Referring to FIG. 15, the printed circuit board 610 may include the controller site CS, the first memory site MS1, the third conductive lines L3, and the fourth conductive lines L4. The printed circuit board 610 may be connected with a connector 620.

The first conductive lines L1 may be physically separated from the second conductive lines L2 and the third conductive lines L3. First pads (i.e., some being covered by the conductive elements CE) that are conductive and correspond to the second conductive lines L2 and second pads (some being covered by the conductive elements CE) that are conductive and correspond to the third conductive lines L3 may be connected with the ends of the first conductive lines L1. Third pads that are conductive may be connected with the ends of the second conductive lines L2. Fourth pads (i.e., that would be covered by the conductive elements CE) that are conductive may be connected with the ends of the third conductive lines L3.

The first channel conductive lines CH1L1 of the first conductive lines L1 and the first channel conductive lines CH1L2 of the second conductive lines L2 may be electrically connected with each other through the conductive elements CE attached to some of the first pads being conductive and some of the third pads being conductive. The second channel conductive lines CH2L1 of the first conductive lines L1 and the second channel conductive lines CH2L3 of the third conductive lines L3 may be electrically connected with each other through the conductive elements CE attached to the others of the first pads being conductive and the others of the third pads being conductive. The third channel conductive lines CH3L1 of the first conductive lines L1 and the third channel conductive lines CH3L2 of the second conductive lines L2 may be electrically connected with each other through the conductive elements CE attached to some of the second pads being conductive and some of the fourth pads being conductive. The fourth channel conductive lines CH4L1 of the first conductive lines L1 and the fourth channel conductive lines CH4L3 of the third conductive lines L3 may be electrically connected with each other through the conductive elements CE attached to the others of the second pads being conductive and the others of the fourth pads being conductive.

Figure 16:
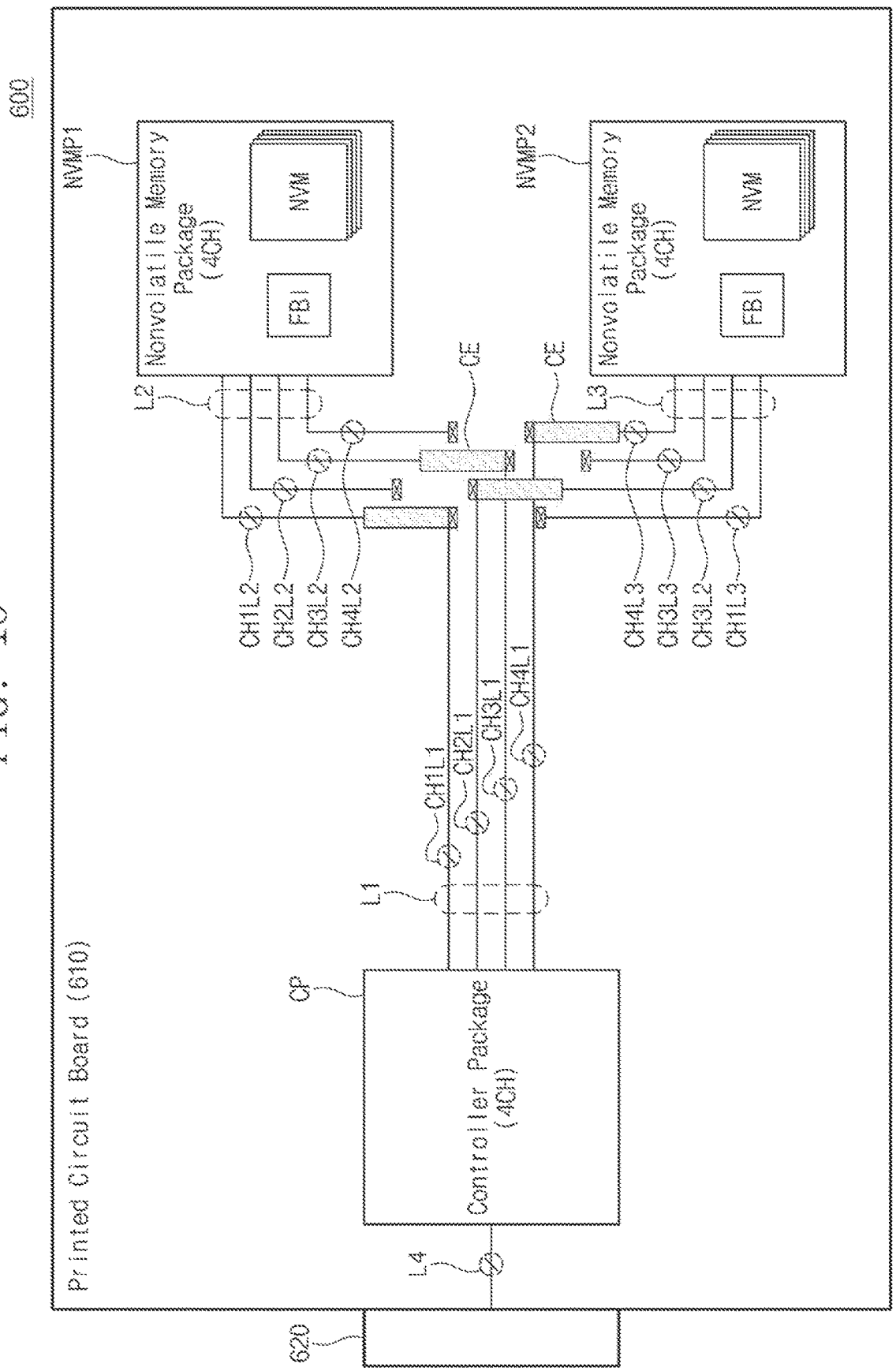
FIG. 16 is a diagram illustrating a storage device according to an example embodiment of the present disclosure.

FIG. 16 is a diagram illustrating a storage device 600 according to an example embodiment of the present disclosure. Referring to FIGS. 15 and 16, the controller package CP may be mounted on the controller site CS of the printed circuit board 610. The first nonvolatile memory package NVMP1 may be mounted on the first memory site MS1 of the printed circuit board 610. The second nonvolatile memory package NVMP2 may be mounted on the second memory site MS2 of the printed circuit board 610.

A configuration of the storage device 600 may be similar to the configuration of the storage device 200 of FIG. 6. Thus, additional description will be omitted to avoid redundancy. The description is given with reference to the storage device 200 of FIG. 6, but features that are not mentioned or are not otherwise mentioned in the storage device 600 of FIG. 16 may be identically applied to the storage device 600 of FIG. 16.

In the above example embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a printed circuit board of a storage device may be configured based on a necessary topology. Accordingly, there is provided the storage device that prevents the signal integrity from being hindered by unused conductive lines of the printed circuit board.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. A storage device comprising:
a printed circuit board comprising:
a controller site,
a first memory site,
a second memory site,
first conductive lines connected with the controller site,
second conductive lines connected with the first memory site, and
third conductive lines connected with the second memory site;
a controller package provided on the controller site;
a first nonvolatile memory package provided on the first memory site;
a second nonvolatile memory package provided on the second memory site; and
at least one resistor connecting at least one conductive line of the first conductive lines with at least one conductive line of the second conductive lines,
wherein the controller package is configured to communicate with the first nonvolatile memory package through a first channel and a second channel.

2. The storage device of claim 1, wherein the first conductive lines are exposed on the printed circuit board,
wherein the second conductive lines are exposed on the printed circuit board,
wherein the third conductive lines are exposed on the printed circuit board, and
wherein the at least one resistor is exposed on the printed circuit board.

3. The storage device of claim 1, wherein at least one conductive line of the third conductive lines is connected with the at least one conductive line of the first conductive lines.

4. The storage device of claim 1, further comprising:
a second resistor connecting at least one conductive line of the third conductive lines with the at least one conductive line of the first conductive lines.

5. The storage device of claim 1,
wherein the at least one conductive line of the first conductive lines, the at least one resistor, and the at least one conductive line of the second conductive lines form first channel conductive lines corresponding to the first channel and second channel conductive lines corresponding to the second channel, and
wherein the first nonvolatile memory package comprises a first nonvolatile memory chip corresponding to the first channel and a second nonvolatile memory chip corresponding to the second channel.

6. The storage device of claim 5, wherein the printed circuit board further comprises separate conductive lines connecting the controller site, the first memory site, and the second memory site to one another,
wherein each of the first channel and the second channel is configured to transfer at least data signals, a data strobe signal, and a read enable signal, and
wherein the separate conductive lines are configured to transfer at least a write enable signal, a command latch enable signal, and an address latch enable signal.

7. The storage device of claim 1, further comprising:
a connector connected with the printed circuit board,
wherein the printed circuit board further comprises fourth conductive lines connecting the connector with the controller site, and
wherein signals transferred through the fourth conductive lines are different from signals transferred through the first conductive lines.

8. The storage device of claim 7, wherein the fourth conductive lines and the connector are configured to transfer signals based on a peripheral component interconnect express (PCIe) or a nonvolatile memory express (NVMe).

9. A storage device comprising:
a printed circuit board comprising:
a controller site,
a first memory site,
a second memory site,
first conductive lines connected with the controller site,
second conductive lines connected with the first memory site, and
third conductive lines connected with the second memory site;
a controller package provided on the controller site;
a first nonvolatile memory package provided on the first memory site;
a second nonvolatile memory package provided on the second memory site; and
resistors connected with at least two of the third conductive lines and at least two of the first conductive lines,
wherein the first conductive lines are connected with the second conductive lines, and
wherein conductive lines of the third conductive lines other than the at least two the third conductive lines are separated from the first conductive lines and the second conductive lines.

10. The storage device of claim 9, wherein the first conductive lines are exposed on the printed circuit board,
wherein the second conductive lines are exposed on the printed circuit board,
wherein the third conductive lines are exposed on the printed circuit board, and
wherein the resistors are exposed on the printed circuit board, and connect the at least two of the third conductive lines with the at least two of the first conductive lines.

11. The storage device of claim 10, wherein a height of upper surfaces of the resistors is higher than a height of upper surfaces of the first conductive lines, a height of upper surfaces of the second conductive lines, and a height of upper surfaces of the third conductive lines.

12. The storage device of claim 9, wherein the controller site comprises first pads to which first solder balls of the controller package are coupled,
wherein the first memory site comprises second pads to which second solder balls of the first nonvolatile memory package are coupled, and
wherein the second memory site comprises third pads to which third solder balls of the second nonvolatile memory package are coupled.

13. The storage device of claim 12, wherein at least half of the second solder balls of the first nonvolatile memory package comprise first dummy solder balls, and
wherein the controller package is configured to control the first nonvolatile memory package through first normal solder balls of the second solder balls of the first nonvolatile memory package, the first normal solder balls being solder balls other than the first dummy solder balls of the second solder balls.

14. The storage device of claim 13, wherein a first number of the first conductive lines form a first plurality of channels together with normal conductive lines of the second conductive lines corresponding to the first normal solder balls of the second solder balls.

15. The storage device of claim 14, wherein the first nonvolatile memory package comprises:
   a frequency boosting interface chip connected with the normal conductive lines; and
   a plurality of nonvolatile memory chips connected with the frequency boosting interface chip.

16. The storage device of claim 14, wherein the printed circuit board further comprises separate conductive lines connecting the controller site, the first memory site, and the second memory site to one another,
   wherein each of the first plurality of channels is configured to transfer at least data signals, a data strobe signal, and a read enable signal, and
   wherein the separate conductive lines are configured to transfer at least a write enable signal, a command latch enable signal, and an address latch enable signal.

17. The storage device of claim 14, wherein at least half of the third solder balls of the second nonvolatile memory package are second dummy solder balls, and
   wherein second normal solder balls of the third solder balls of the second nonvolatile memory package are connected with a number of the third conductive lines, the second normal solder balls being solder balls other than the second dummy solder balls.

18. The storage device of claim 17, wherein a second number of the first conductive lines form a second plurality of channels together with normal conductive lines of the second conductive lines corresponding to the second normal solder balls of the second nonvolatile memory package.

19. A storage device comprising:
   a printed circuit board comprising:
      a controller site,
      a first memory site,
      a second memory site,
      first conductive lines connected with the controller site,
      second conductive lines connected with the first memory site, and
      third conductive lines connected with the second memory site;
   a controller package provided on the controller site;
   a first nonvolatile memory provided mounted on the first memory site;
   a second nonvolatile memory package provided on the second memory site;
   first resistors connected with at least two of the first conductive lines and at least two of the second conductive lines; and
   second resistors connected with conductive lines other than the at least two of the first conductive lines and at least two of the third conductive lines.

20. The storage device of claim 19, wherein conductive lines of the second conductive lines other than the at least two conductive lines of second conductive lines are separated from the first conductive lines and the third conductive lines, and
   wherein conductive lines of the third conductive lines other than the at least two third conductive lines of the third conductive lines are separated from the first conductive lines and the second conductive lines.

* * * * *